United States Patent
Kano et al.

(10) Patent No.: US 11,978,898 B2
(45) Date of Patent: May 7, 2024

(54) POSITIVE ELECTRODE FOR NONAQUEOUS ELECTROLYTE BATTERY AND NONAQUEOUS ELECTROLYTE BATTERY

(71) Applicant: KABUSHIKI KAISHA TOSHIBA, Minato-ku (JP)

(72) Inventors: Tetsuro Kano, Kashiwazaki (JP); Dai Yamamoto, Kashiwazaki (JP); Yuki Watanabe, Kashiwazaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 290 days.

(21) Appl. No.: 16/807,752

(22) Filed: Mar. 3, 2020

(65) Prior Publication Data
US 2020/0203725 A1    Jun. 25, 2020

Related U.S. Application Data

(63) Continuation of application No. PCT/JP2018/041197, filed on Nov. 6, 2018.

(30) Foreign Application Priority Data

Nov. 7, 2017    (JP) .................................. 2017-214994

(51) Int. Cl.
*H01M 4/505*    (2010.01)
*H01M 4/02*    (2006.01)
(Continued)

(52) U.S. Cl.
CPC ........... *H01M 4/505* (2013.01); *H01M 4/131* (2013.01); *H01M 4/364* (2013.01); *H01M 4/525* (2013.01);
(Continued)

(58) Field of Classification Search
CPC .......... Y02E 60/10; Y02T 10/70; Y02P 70/50; H01M 4/50; H01M 4/505; H01M 10/0525;
(Continued)

(56) References Cited

U.S. PATENT DOCUMENTS

2005/0221179 A1* 10/2005 Baeuerlein .............. H01M 4/32
423/594.19
2010/0209771 A1    8/2010 Shizuka et al.
(Continued)

FOREIGN PATENT DOCUMENTS

EP    2 110 872 A1    10/2009
EP    2 202 828 A1    6/2010
(Continued)

OTHER PUBLICATIONS

International Search Report dated Feb. 5, 2019 in PCT/JP2018/0041197 filed Nov. 6, 2018, 2 pages.
(Continued)

*Primary Examiner* — Lisa S Park
(74) *Attorney, Agent, or Firm* — Oblon, McClelland, Maier & Neustadt, L.L.P.

(57) ABSTRACT

A positive electrode for nonaqueous electrolyte battery includes specific peaks in pyrolysis GC/MS measurement, and includes specific pore diameters and pore volumes in a pore distribution curve attained by a mercury intrusion method.

6 Claims, 3 Drawing Sheets

(51) Int. Cl.
  *H01M 4/131* (2010.01)
  *H01M 4/36* (2006.01)
  *H01M 4/525* (2010.01)
  *H01M 4/62* (2006.01)
  *H01M 4/66* (2006.01)
  *H01M 10/0525* (2010.01)
  *H01M 50/46* (2021.01)

(52) U.S. Cl.
  CPC ........... *H01M 4/623* (2013.01); *H01M 4/662* (2013.01); *H01M 10/0525* (2013.01); *H01M 50/46* (2021.01); *H01M 2004/021* (2013.01); *H01M 2004/027* (2013.01); *H01M 2004/028* (2013.01)

(58) Field of Classification Search
  CPC ...... H01M 4/131; H01M 4/364; H01M 4/622; H01M 4/623; H01M 2004/021; H01M 2004/027; H01M 2004/028; H01M 4/525; H01M 50/46; H01M 4/485; H01M 4/1391
  See application file for complete search history.

(56) References Cited

U.S. PATENT DOCUMENTS

| | | |
|---|---|---|
| 2011/0003200 A1 | 1/2011 | Shizuka et al. |
| 2012/0189915 A1 | 7/2012 | Cho et al. |
| 2012/0280172 A1* | 11/2012 | Takeda .................. H01M 4/525 252/182.1 |
| 2013/0330613 A1* | 12/2013 | Saruwatari .......... H01M 10/052 429/211 |
| 2013/0330627 A1 | 12/2013 | Matsuno et al. |
| 2014/0199583 A1 | 7/2014 | Kondo et al. |
| 2014/0272551 A1 | 9/2014 | Saruwatari et al. |
| 2014/0272562 A1 | 9/2014 | Watanabe et al. |
| 2014/0295291 A1 | 10/2014 | Kondo et al. |
| 2015/0079470 A1 | 3/2015 | Kano et al. |
| 2016/0301071 A1 | 10/2016 | Shizuka et al. |

FOREIGN PATENT DOCUMENTS

| | | |
|---|---|---|
| EP | 2 779 282 A1 | 9/2014 |
| JP | 9-320607 A | 12/1997 |
| JP | 2012-151112 A | 8/2012 |
| JP | 5522844 B2 | 6/2014 |
| JP | 2014-179240 A | 9/2014 |
| JP | 2015-60656 A | 3/2015 |
| JP | 2015-84323 A | 4/2015 |
| JP | 2015-149267 A | 8/2015 |
| JP | 5813336 B2 | 11/2015 |
| JP | 2018-045819 | 3/2018 |
| WO | WO 2013/145110 A1 | 10/2013 |

OTHER PUBLICATIONS

Extended European Search Report dated Jul. 16, 2021 in European Patent Application No. 18876028.4, 7 pages.

* cited by examiner

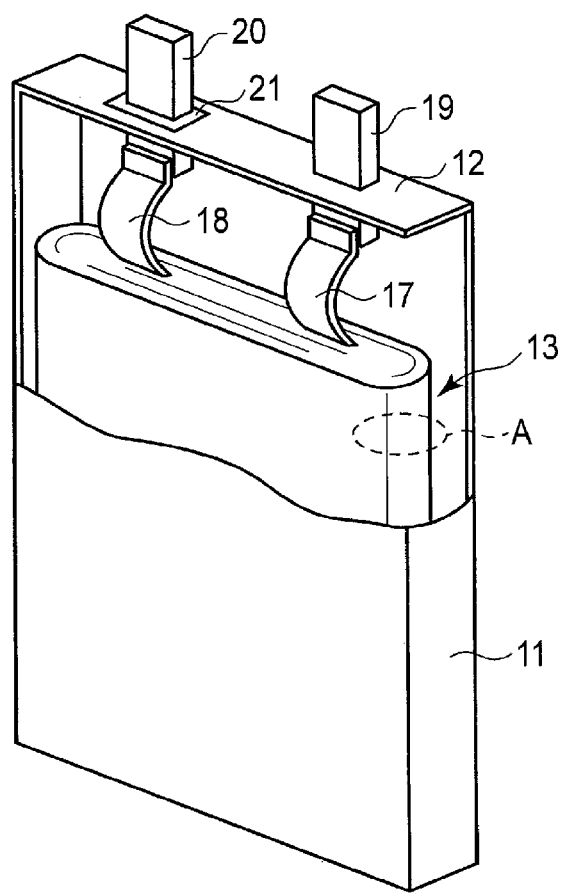
F I G. 1
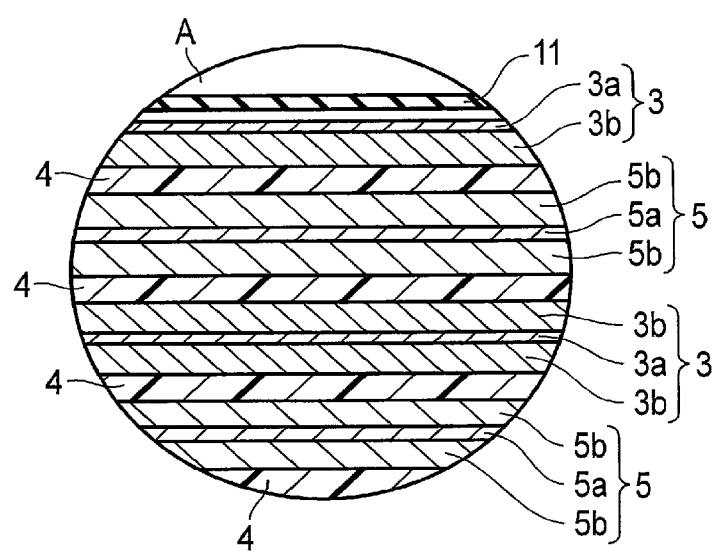
F I G. 2

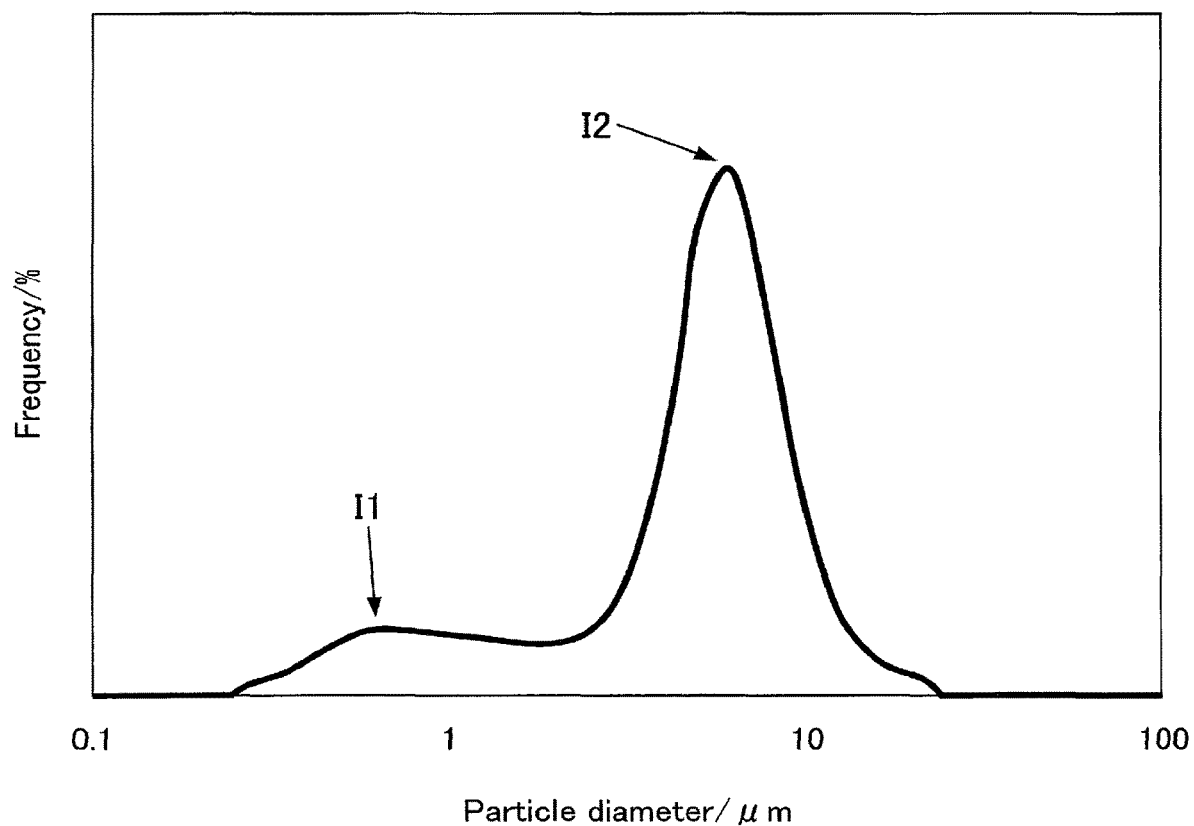
F I G. 5

POSITIVE ELECTRODE FOR NONAQUEOUS ELECTROLYTE BATTERY AND NONAQUEOUS ELECTROLYTE BATTERY

CROSS-REFERENCE TO RELATED APPLICATIONS

This is a Continuation Application of PCT Application No. PCT/JP2018/041197, filed Nov. 6, 2018, and is based upon and claims the benefit of priority from prior Japanese Patent Application No. 2017-214994, filed Nov. 7, 2017, the entire contents of all of which are incorporated herein by reference.

FIELD

Embodiments of the present invention relate to a positive electrode for nonaqueous electrolyte battery and a nonaqueous electrolyte battery.

BACKGROUND

The electrodes of nonaqueous electrolyte batteries including nonaqueous electrolyte secondary batteries are fabricated by, for example, adding a conductive agent and a binder to an active material, suspending these in an appropriate solvent, applying this suspension (slurry) to a current collector, and drying and pressing the coated current collector. In addition, it is known that the plane orientation of the electrode active material is changed depending on the dispersion conditions at the time of the suspension preparation step, the suspension application conditions, and the subsequent pressing conditions in this electrode fabrication, and this plane orientation greatly affects the battery performance.

BRIEF DESCRIPTION OF THE DRAWINGS

FIG. 1 illustrates a cutaway perspective view of a nonaqueous electrolyte secondary battery according to an embodiment.

FIG. 2 illustrates a partial sectional view of an electrode group according to an embodiment.

FIG. 5 illustrates a particle size distribution diagram of a positive electrode according to an embodiment.

DETAILED DESCRIPTION

Figure 3:
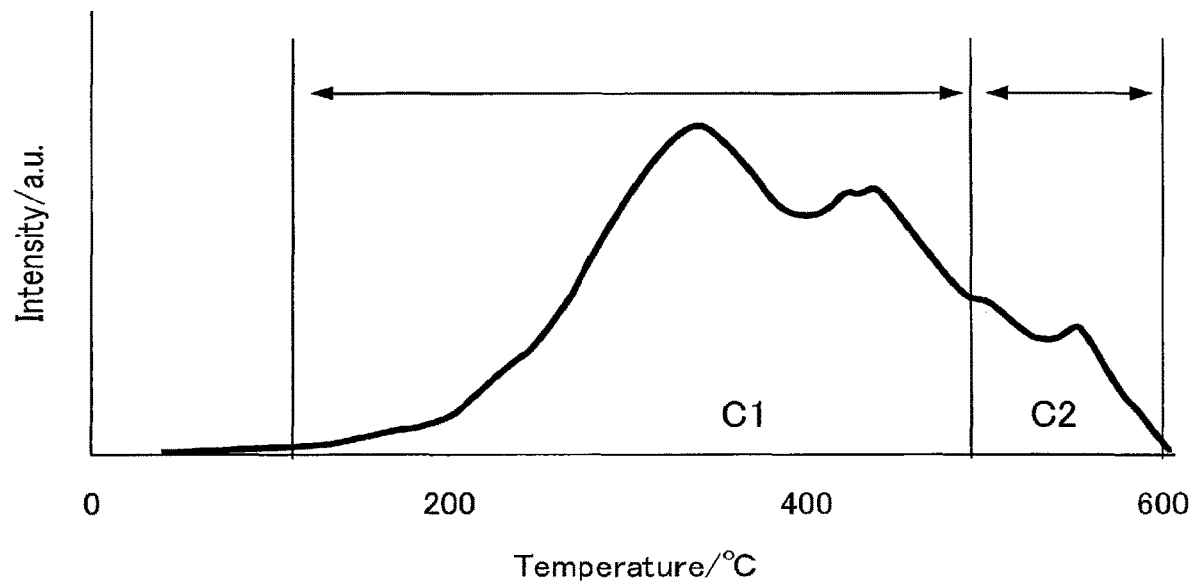
FIG. 3 illustrates a pyrolysis GC/MS measurement chart of a positive electrode according to an embodiment.

In order to solve the above problem, a positive electrode for a nonaqueous electrolyte battery according to an embodiment includes: a positive electrode material layer including, when the positive electrode material layer is subjected to pyrolysis GC/MS measurement under a temperature rise condition of 5° C./min, a first region having a peak top in a range of 100° C. to 500° C. and a second region having a peak top in a range of 500° C. to 600° C., where peak areas (mL/g) C1 and C2 of the first region and the second region satisfy a following Formula (1):

$$6 \leq C1/C2 \leq 10 \qquad (1),$$

the positive electrode including, in a pore distribution curve attained by a mercury intrusion method, a first peak (P1) having a mode diameter in a range where a pore diameter is 0.1 µm or more and 0.3 µm or less and a second peak (P2) having a mode diameter in a range where a pore diameter is 0.3 µm or more and 1 µm or less, and when pore volumes at peak tops of the peak (P1) and the peak (P2) are denoted as P1 [ml/g] and P2 [ml/g], respectively, these satisfy a following Formula (2):

$$0.60 \leq P1/(P1+P2) \leq 0.9 \qquad (2), \text{ and}$$

when a pore volume V1 [ml/g] of pores having a pore diameter of 0.1 µm or more and 1.0 µm or less and a total pore volume V [ml/g], these satisfy a following Formula (3):

$$0.45 \leq V1/V \leq 0.7 \qquad (3); \text{ and}$$

a positive electrode current collector on which the positive electrode material layer is formed.

According to an embodiment, a positive electrode for a nonaqueous electrolyte battery is provided. The positive electrode for a nonaqueous electrolyte battery includes a positive electrode current collector and a positive electrode material layer that is formed on the positive electrode current collector and contains an active material. When the positive electrode material layer is subjected to pyrolysis GC/MS measurement under a temperature rise condition of 5° C./min, an area C1 (mL/g) of a first region having a peak top in a range of 100° C. or more and less than 500° C. and an area C2 (mL/g) of a second region having a peak top in a range of 500° C. or more and 600° C. or less satisfy a following Formula (1):

$$6 \leq C1/C2 \leq 10 \qquad (1).$$

The positive electrode includes, in a pore distribution curve attained by a mercury intrusion method, includes a first peak (PA) corresponding to a mode diameter appearing in a range where a pore diameter is 0.1 µm or more and less than 0.3 µm and a second peak (PB) corresponding to a mode diameter appearing in a range where a pore diameter is 0.3 µm or more and 1 µm or less. When pore volumes at peak tops of the peak (PA) and the peak (PB) are denoted as P1 [ml/g] and P2 [ml/g], respectively, these satisfies a following Formula (2):

$$0.60 \leq P1/(P1+P2) \leq 0.9 \qquad (2).$$

When a pore volume V1 [ml/g] of pores having a pore diameter of 0.1 µm or more and 1.0 µm or less and a total pore volume V [ml/g], these satisfys a following Formula (3):

$$0.45 \leq V1/V \leq 0.7 \qquad (3).$$

Hereinafter, a positive electrode for nonaqueous electrolyte battery and a nonaqueous electrolyte battery according to embodiments of the present invention will be described.

The battery according to the embodiments includes an electrode group in which a positive electrode and a negative electrode are disposed with a separator interposed therebetween and a nonaqueous electrolyte. The positive electrode, which is a characteristic member of the embodiments, will be described in detail. The positive electrode includes a current collector and a positive electrode active material layer which is supported on one or both surfaces of the current collector, contains a lithium compound as an active material, and further contains a binder and a conductive material if necessary.

In the present specification, the positive electrode material layer, the positive electrode active material layer, the positive electrode mixture layer, and the positive electrode active material-containing layer indicate the same layer. In addition, the negative electrode active material layer, the negative electrode mixture layer, and the negative electrode active material-containing layer indicate the same layer.

The positive electrode has a first peak (P1) corresponding to a mode diameter appearing in a range where the pore diameter is 0.1 μm or more and less than 0.3 μm and a second peak (P2) corresponding to a mode diameter appearing in a range where the pore diameter is 0.3 μm or more and 1 μm or less in a pore distribution curve attained by a mercury intrusion method, and satisfies 0.60≤P1/(P1+P2)≤0.9 when pore volumes at peak tops of the peak (P1) and the peak (P2) are denoted as P1 [ml/g] and P2 [ml/g], respectively. In the positive electrode, a pore volume V1 [ml/g] of pores having a pore diameter of 0.1 μm or more and 1.0 μm or less and a total pore volume V [ml/g] satisfy 0.45≤V1/V≤0.7 in the pore distribution curve.

In the present specification, the first peak P1 is also referred to as a first peak PA. In addition, the second peak P2 is also referred to as a second peak PB.

Incidentally, the $CO_2$ (m/z 44) profile attained by pyrolysis GC/MS measurement of the positive electrode mixture layer has the following features. In the $CO_2$ (m/z 44) profile attained by pyrolysis GC/MS measurement performed under a temperature rise condition of 5° C./min, an area C1 (mL/g) of a first region having a peak top in a range of 100° C. or more and less than 500° C. and an area C2 (mL/g) of a second region having a peak top in a range of 500° C. or more and 600° C. or less satisfy 6≤C1/C2≤10.

It is preferable that the ratio C1/C2 of the area C1 (mL/g) of the first region to the area C2 (mL/g) of the second region satisfies 6≤C1/C2≤8.

Moreover, in the particle size distribution measurement of the positive electrode, it is preferable that the positive electrode has a first peak (I1) corresponding to a mode diameter appearing in a range of 0.1 μm or more and 2.0 μm or less and a second peak (I2) corresponding to a mode diameter appearing in a range of 3.0 μm or more and 8.0 μm or less and I1/(I1+I2) satisfies 0.10 or more and 0.30 or less when volume frequencies of the peaks (I1) and (I2) are denoted as I1 [%] and I2 [%], respectively. It is more preferable that the ratio I1/(I1+I2) satisfies 0.10≤I1/(I1+I2)≤0.20.

The particle size distribution measurement of the positive electrode can be performed by a laser diffraction method.

In the present specification, the first peak I1 is also referred to as a first peak IA. In addition, the second peak I2 is also referred to as a second peak IB.

Furthermore, the binder contained in the positive electrode material layer is preferably added in a range of 0.1 parts by weight or more and 4 parts by weight or less with respect to 100 parts by weight of the active material.

In the positive electrode as described above, the pore diameter distribution of the electrode measured by a mercury intrusion method has peaks of the first peak PA and the second peak PB. The first peak PA corresponding to 0.1 μm or more and less than 0.3 μm is a peak which usually appears in the case of using active materials such as lithium-containing nickel-cobalt-manganese composite oxide and lithium-containing cobalt oxide. Meanwhile, the second peak PB corresponding to 0.3 μm or more and 1.0 μm or less is attributed to relatively large pores, which appear when various particle diameters are generated by applying a large quantity of energy through a treatment such as bead milling for dispersion and by performing mixing with other particles such as a conductive agent and performing a treatment such as bead milling in fabricating a positive electrode mixture layer. In an electrode having such a peak, relatively large voids included in the second peak present in the electrode can absorb a change in volume of the active material due to charge and discharge. For this reason, distortion in the electrode caused by a change in volume of the active material can be suppressed. Hence, a decrease in performance of the binder contained in the electrode can be suppressed even in a case where charge and discharge is repeatedly performed, and thus the electrode structure including the conductive path in the electrode can be maintained.

Moreover, gas is generated on the surfaces of the active material, conductive material, and current collector by reactions by which components of the electrolyte solution and impurity components are decomposed. With regard to such gas as well, the electrode has a pore diameter peak belonging to the second peak PB in addition to the pore diameter peak belonging to the first peak PA, and thus the gas generated is easily diffused. Hence, distortion of the electrode structure due to the gas generated can be suppressed. For this reason, it is considered that the electrode structure including the conductive path can be maintained even when charge and discharge is repeatedly performed by controlling the positive electrode so that such pore distribution is achieved.

Moreover, a large amount of electrolyte is retained in relatively large pores by fabricating an electrode having a pore diameter peak in a region of 0.3 μm or more and 1.0 μm or less in addition to a region of 0.1 μm or more and less than 0.3 μm. Li ions which migrate in the electrolyte solution exhibit more favorable diffusibility as the amount of the electrolyte solution present in the electrode increases. On the other hand, in a state in which the pore diameter is small, the number of contact points between the active materials is great and sufficient conductive paths of electrons are easily formed. Consequently, a state in which the diffusibility of Li ions and the conductive paths of electrons are appropriately maintained is realized as the electrode has such a pore diameter peak, and it is thus possible to maintain a state in which the concentration overpotential of local Li ions is small. Local decomposition side reactions of the organic substances in the electrode including the binder hardly take place since the concentration overpotential is small.

Furthermore, the decrease in performance of the binder is also small, it can be thus said a state in which the electrode structure including the conductive paths is easily maintained. Moreover, the local decomposition reaction is suppressed, and thus the coating component generated is less localized in the electrode mixture layer even if the decomposition of electrolyte solution is caused. The coating component generated can be expected to have a function of binding the particles forming the electrode mixture layer to each other and it is thus possible to suppress a decrease in the binding function due to repeated charge and discharge.

In a case where P1/(P1+P2) is less than 0.60, it means that the pore volume of pores having a pore diameter in a range of 0.3 μm or more and 1.0 μm or less is greater as compared with that in the above positive electrode. Hence, the number of voids in the positive electrode mixture layer increases and the density of the positive electrode mixture layer decreases. Furthermore, a decrease in energy density of the battery is brought about.

In addition, in a case where P1/(P1+P2) exceeds 0.9, it means that the pore volume of pores having a pore diameter in a range of 0.1 μm or more and less than 0.3 μm is greater as compared with that in the above positive electrode. In this case, the effect attained when there is the peak P2 is not exerted The ratio P1/(P1+P2) preferably satisfies 0.65≤P1/(P1+P2)≤0.85.

In addition, with regard to the pore volume, the ratio V1/V of the pore volume V1 [ml/g] of 0.1 μm or more and 1.0 μm or less to the total pore volume V [ml/g] satisfies 0.45 or more and 0.7 or less.

The total pore volume V is, for example, a value attained by summing the pore volumes of pores having a pore diameter in a range 0.003 μm or more and 60 μm or less.

In a case where V1/V is less than 0.45, it means that the pore volume of pores having a pore diameter of 0.1 μm or more and 1.0 μm or less is relatively small and the pore volume of pores having a pore diameter of less than 0.1 μm or more than 1.0 μm is great. At this time, the pores corresponding to P1 and P2 described above are not sufficiently formed, and the effect is not exerted.

In addition, by a treatment such as bead milling when the positive electrode mixture layer is formed, pores having a pore diameter of less than 0.1 μm or more than 1.0 μm are formed in a considerable amount and V1/V does not exceed 0.7.

In other words, as the ratio V1/V of the pore volume V1 [ml/g] of pores having a pore diameter of 0.1 μm or more and 1.0 μm or less to the total pore volume V [ml/g] satisfies 0.45 or more and 0.7 or less with regard to the pore volume, an electrode can be realized in which the electrolyte solution is properly retained in the positive electrode mixture layer and which can suppress the deterioration in output characteristics of the battery.

The ratio V1/V of the pore volume V1 of pores having a pore diameter of 0.1 μm or more and 1.0 μm or less to the total pore volume V preferably satisfies 0.45≤V1/V≤0.65.

In order to increase the pore volume V1, an operation is effective in which the voids between particles are increased by strongly dispersing the mixture layer-constituting particles by a treatment such as bead milling and/or using those having a small particle diameter and a narrow particle size distribution of mixture layer-constituting particles. In order to decrease the pore volume V1, it is effective to perform an operation of suppressing the generation of voids between the mixture layer-constituting particles, that is, to suppress the dispersion of the mixture layer-constituting particles and/or to use those having a large particle diameter and a wide particle size distribution of mixture layer-constituting particles.

The total pore volume per unit mass can be controlled by increasing or decreasing the specific surface area ($m^2/g$) of each material for the mixture layer-constituting material and the electrode density. For example, in a case where the specific surface area of each constituent material is large and/or in a case where the electrode density is low, the total pore volume tends to be high. For this reason, the total pore volume V in the pore distribution curve attained by a mercury intrusion method tends to be high in this case. On the other hand, in a case where the specific surface area of each material for the mixture layer-constituting material is small and/or in a case where the electrode density is high, the total pore volume tends to be low. For this reason, the total pore volume V in the pore distribution curve attained by a mercury intrusion method tends to be low in this case.

According to the present embodiment, in the positive electrode mixture layer with controlled pore diameter distribution, the amount of $CO_2$ generated in a temperature region which is considered to be derived from the coating component and binder is great in the $CO_2$ profile attained by pyrolysis GC/MS measurement. Hereinafter, this $CO_2$ profile will be described.

The existence form of carbon dioxide in the electrode can be confirmed by pyrolysis GC/MS measurement. The pyrolysis GC/MS referred to here is an apparatus in which a GC (gas chromatograph) equipped with a pyrolyzer is directly connected to a MS (mass spectrometer). In a case where the electrode contains carbon dioxide or in a case where there is a substance which promotes the generation of carbon dioxide by being heated, a peak appears in the chromatogram attained by pyrolysis GC/MS measurement.

When the positive electrode mixture layer according to the present embodiment is subjected to pyrolysis GC/MS measurement, two peaks are observed from 100° C. or more to less than 500° C. and one peak is observed from 500° C. or more to 600° C. or less. This means that there are two or more factors of $CO_2$ generation. With regard to these peaks, it is considered that the $CO_2$ peak from 500° C. or more to 600° C. or less is attributed to the active material and the $CO_2$ peaks from 100° C. or more to less than 500° C. are attributed to the decomposition of binder, $CO_2$ that is physically adsorbed on the electrode, or the decomposition of coating component generated by the decomposition reaction of electrolyte solution from the comparison of the results attained by singly subjecting each of the active material and the binder to pyrolysis GC/MS measurement with each other.

A positive electrode mixture layer in which the above-mentioned binding function is hardly impaired can be obtained by controlling the positive electrode mixture layer so that this $CO_2$ (m/z 44) profile has the following features. The $CO_2$ (m/z 44) profile is attained by pyrolysis GC/MS measurement performed under a temperature rise condition of 5° C./rain. In other words, the positive electrode mixture layer is a positive electrode mixture layer having a $CO_2$ (m/z 44) profile which has a first region having a peak top in a range of 100° C. or more and less than 500° C. and a second region having a peak top in a range of 500° C. or more and 600° C. or less and in which the ratio C1/C2 of the areas (mL/g) C1 and C2 of the first region and the second region satisfies 6 or more and 10 or less.

The baseline in the $CO_2$ profile is a straight line which passes through two points of the measurement-started temperature (normal temperature) and the upper limit measurement temperature of 600° C. The area C1 of the first region is an area of a portion surrounded by a baseline and a curve within a range of 100° C. or more and less than 500° C. The area C2 of the second region is an area of a portion surrounded by a baseline and a curve within a range of 500° C. or more and 600° C. or less.

In a case where the pore diameter distribution of the positive electrode mixture layer is controlled, the two $CO_2$ peaks observed from 100° C. or more to less than 500° C. are more largely observed as compared with the $CO_2$ peak attributed to the active material from 500° C. or more to 600° C. or less.

This is because alkali components such as lithium carbonate remaining inside the active material are eluted by controlling the dispersion by bead milling so as to have specific pore diameters. The positive electrode mixture layer is formed after the alkali components are eluted in this manner, and thus the attachment of alkali components such as lithium carbonate remaining inside the active material to the surface of active material at the time of charge and discharge can be suppressed. The $CO_2$ peak attributed to the active material from 500° C. or more to 600° C. or less is decreased by this, and thus a relative increase in the $CO_2$ peak ratio from 100° C. or more to less than 500° C. is considered as one factor which makes C1/C2 fall in a predetermined numerical range.

In other words, when the bead milling is performed for a long time, the alkali components present on the surface of active material and inside the aggregate of primary particles such as secondary particles elute into the slurry (for example, NMP). The alkali components eluted in the slurry are consumed through the reaction with hydrofluoric acid HF released from the binder (for example, PVdF) contained in the slurry. In other words, a part of $CO_2$ that would have been observed as $CO_2$ released from 500° C. or more to 600° C. or less is consumed in the above reaction.

For this reason, there is a tendency that the area C2 decreases and the area C1 does not change much. As a result, the ratio C1/C2 tends to be higher as compared with a case where the treatment time of bead milling is short.

Moreover, in a case where the bead mill dispersion is controlled so as to have specific pore diameters, there are pore diameter peaks in a region of 0.3 µm or more and 1.0 µm or less in addition to a region of 0.1 µm or more and less than 0.3 µm as indicated by the peaks of P1 and P2 described above.

As described above, such a state is considered to be a state in which the electrolyte solution-retaining property is favorable and the electrolyte solution is likely to be uniformly present in the voids in the electrode mixture layer. In this case, the diffusibility of Li ions in the electrode mixture layer is favorable, and thus a state in which the local concentration overpotential of Li ions is small can be maintained. The overpotential is small, and thus the coating component to be generated is present in the electrode mixture layer in a less localized state even if the decomposition of electrolyte solution is caused.

In this case, the coating components are uniformly present inside and in the vicinity of the pores, and thus the reaction to generate $CO_2$ uniformly takes place inside and in the vicinity of the pores. Gas generated inside and in the vicinity of the pores can be released from the pores, and thus an increase in $CO_2$ peak from 100° C. or more to less than 500° C. is considered as another factor in the positive electrode taking such a distribution form of coating components.

In other words, the coating components uniformly formed in the pores in the electrode and in the vicinity of the pores are easily pyrolyzed at the time of the pyrolysis GC/MS measurement and gasified as $CO_2$. For this reason, in a case where the bead mill dispersion is controlled so as to have specific pore diameters, the area C1 tends to be larger than the area C2, that is, the ratio C1/C2 tends to increase.

Incidentally, a similar electrode state can be attained by applying a polymer material which generates a large amount of $CO_2$ in the pyrolysis measurement as a binder in addition to the coating component formed by the decomposition of electrolyte solution. For example, those having a carboxyl group, a carbonyl group, an aldehyde group, and a hydroxyl group as a constituent functional group and polymer materials having an ether bond and an ester bond in the molecule can be applied. Such polymer materials exhibit high intramolecular polarity and can be thus expected to have a high binding force.

When a polymer material which generates a large amount of $CO_2$ is applied as a binder, the amount of $CO_2$ released from 500° C. or more to 600° C. or less does not change but the amount of $CO_2$ released from 100° C. or more to less than 500° C. increases.

In a case where a polymer material having the above constituent functional group is applied to an electrode with controlled pore diameter distribution, in particular, a state is realized in which the electrolyte solution-retaining property of electrode is favorable and the electrolyte solution is likely to be uniformly present in the voids in the electrode mixture layer. For this reason, the diffusibility of Li ions in the electrode mixture layer is favorable, and thus a state in which the local concentration overpotential of Li ions is small can be maintained. Hence, it is possible to attain a state in which a local decomposition side reaction of binder hardly takes place and high binding performance is easily maintained.

On the other hand, in a case where C1/C2 is less than 6, it means that the amount of $CO_2$ that is generated from the binder or the coating components generated by the decomposition of electrolyte solution and detected in the pyrolysis measurement is small and the ability to maintain the binding function by the binder or the coating components generated by the decomposition of electrolyte solution is low. For this reason, the binding function decreases as charged and discharge is repeated, and the dissociation of active materials from each other takes place and the like to cause an increase in resistance.

Moreover, in a case where C1/C2 exceeds 10, it means that the amount of $CO_2$ that is generated from the binder or the coating components generated by the decomposition of electrolyte solution and detected in the pyrolysis measurement is great. In this case, it is considered to be in a state in which a material which generates a large amount of gas at the time of the decomposition reaction of binder is applied, the binder is excessively present, or the coating components generated by the decomposition of electrolyte solution are excessively present.

In a case where the binder is excessively present, the resistance of the battery increases since the conductive paths are obstructed by the excess binder even before the deterioration, and the like. In addition, in a case where the coating components generated by the decomposition of electrolyte solution are excessively present, the reaction is inhibited by the coating components and an increase in resistance is caused.

In other words, a positive electrode mixture layer having a feature so that C1/C2 satisfies 6 or more and 10 or less is formed by controlling the dispersion by bead milling so as to have specific pore diameters, and it is considered that a battery having such a positive electrode mixture layer can be improved in cycle characteristics.

In the particle size distribution measurement of the positive electrode, it is preferable that there are a first peak (IA) corresponding to a mode diameter appearing in a range of 0.1 µm or more and 2.0 µm or less and a second peak (IB) corresponding to a mode diameter appearing in a range of 3.0 µm or more and 8.0 µm or less and I1/(I1+I2) satisfies 0.10 or more and 0.30 or less when volume frequencies of the peaks (IA) and (IB) are denoted as I1 [%] and I2 [%], respectively.

The first peak IA corresponding to a mode diameter appearing in a range of 0.1 µm or more and 2.0 µm or less means the presence of primary particles, and the second peak IB corresponding to a mode diameter appearing in a range of 3.0 µm or more and 8.0 µm or less means the presence of secondary particles formed by aggregation of primary particles. In a case where the value of I1/(I1+I2) is a value smaller than 0.10, it means that the peak value on the smaller particle diameter side is low and it indicates that there are a large number of secondary particles formed by aggregation of primary particles in the positive electrode. On the other hand, in a case where the above relational expression is greater than 0.3, it means a state in which the active material is crushed and a large number of fine particles are present, that is, that there are a large number of single primary particles in the positive electrode. Hence, in a case where I1/(I1+I2) satisfies 0.10 or more and 0.30 or less, the abundance ratio of the secondary particles to the single primary particles which do not constitute the secondary particles can be set to a more optimal value, and thus the effect of suppressing the increase in resistance and the deterioration in capacity due to the progress of cycles can be further increased.

In a case where bead mill dispersion, for example, is performed as a dispersion method when a slurry for mixture layer formation is prepared, the particle size distribution of the particles constituting the mixture layer can be controlled by increasing or decreasing the bead diameter of the bead mill or increasing or decreasing the rotation number of the bead mill. In a case where the bead diameter is large and/or a case where the rotation number of the bead mill is small, the dispersing force is weak, and thus there is a tendency that the volume frequency I1 decreases and the volume frequency I2 increases. In a case where the bead diameter is small and/or a case where the rotation number of the bead mill is large, the dispersing force is strong, and thus there is a tendency that the volume frequency I1 increases and the volume frequency I2 decreases. Alternatively, the values of the volume frequency I1 and volume frequency I2 can be controlled by controlling the particle diameter of the material to be used in the formation of mixture layer in advance as well.

Moreover, the binder contained in the positive electrode material layer is preferably added in a range of 0.1 parts by weight or more and 4 parts by weight or less with respect to 100 parts by weight of the active material. In a case where the added amount is less than 0.1 parts by weight, the function of binding the electrode mixture layer-constituting particles cannot be sufficiently attained. On the other hand, in a case where the added amount exceeds 4 parts by weight, the function of binding the electrode mixture layer-constituting particle is exerted, but there is a possibility that the binder which can inhibit the charge and discharge reaction is in an excessive state and the battery resistance increases.

In addition, various oxides, sulfides, and the like can be used as the active material. Examples thereof include manganese dioxide ($MnO_2$), iron oxide, copper oxide, nickel oxide, lithium-manganese composite oxide (for example, $Li_xMn_2O_4$ or $Li_xMnO_2$), lithium-nickel composite oxide (for example, $Li_xNiO_2$), lithium-cobalt composite oxide ($Li_xCoO_2$), lithium-nickel-cobalt composite oxide {for example, $LiNi_{1-y-z}Co_yM_zO_2$ (M is at least one element selected from the group consisting of Al, Cr, and Fe), $0 \leq y \leq 0.5$, $0 \leq z \leq 0.1$}, lithium-manganese-cobalt composite oxide {for example, $LiMn_{1-y-z}Co_yM_zO_2$ (M is at least one element selected from the group consisting of Al, Cr, and Fe), $0 \leq y \leq 0.5$, $0 \leq z \leq 0.1$}, lithium manganese nickel composite compound {for example $LiMn_xNi_xM_{1-2x}O_2$ (M is at least one element selected from the group consisting of Co, Cr, Al, and Fe), $\frac{1}{3} \leq x \leq \frac{1}{2}$; for example, $LiMn_{1/3}Ni_{1/3}Co_{1/3}O_2$, $LiMn_{1/2}Ni_{1/2}O_2$}, spinel lithium-manganese-nickel composite oxide ($Li_xMn_{2-y}Ni_yO_4$), lithium phosphorus oxide having an olivine structure ($LixFePO_4$, $Li_xFe_{1-y}Mn_yPO_4$, $Li_xCoPO_4$, and the like), iron sulfate ($Fe_2(SO_4)_3$), and vanadium oxide (for example, $V_2O_5$). Moreover, conductive polymer materials such as polyaniline and polypyrrole, disulfide-based polymer materials, and organic materials and inorganic materials such as sulfur (S) and carbon fluoride can also be used. Incidentally, in a case where x, y, and z are not specified in the above chemical formulas, these are each preferably in a range of 0 or more and 1 or less.

More preferred active materials include lithium-manganese composite oxide, lithium-nickel composite oxide, lithium-cobalt composite oxide, lithium-nickel-cobalt composite oxide, lithium-manganese-nickel composite compound, spinel lithium-manganese-nickel composite oxide, lithium-manganese-cobalt composite oxide, and lithium iron phosphate. By using these active materials, a nonaqueous electrolyte battery having high voltage can be obtained.

The active material contains, for example, at least one selected from the group consisting of lithium-manganese composite oxide, lithium-nickel composite oxide, lithium-cobalt composite oxide, lithium-nickel-cobalt composite oxide, lithium-manganese-nickel composite compound, spinel lithium-manganese-nickel composite oxide, lithium-manganese-cobalt composite oxide, and lithium iron phosphate.

As the conductive agent, for example, acetylene black, Ketjen black, graphite, coke, and the like can be used. One of these may be used as the conductive agent, or two or more of these may be used as the conductive agent in combination.

As the binder, for example, polytetrafluoroethylene (PTFE), polyvinylidene fluoride (PVdF), and fluorine-based rubber can be used. One of these may be used as the binder, or two or more of these may be used as the binder in combination.

The binder contains, for example, at least one selected from the group consisting of polytetrafluoroethylene (PTFE), polyvinylidene fluoride (PVdF), and fluorine-based rubber. Polyvinylidene fluoride (PVdF) may have at least one functional group selected from a carboxyl group, a carbonyl group, an aldehyde group, a hydroxyl group, an ether bond, or an ester bond.

The blending proportions of the active material, the conductive agent, and the binder are preferably in a range of 80% to 95% by weight for the active material, 3% to 18% by weight for the conductive agent, and 2% to 7% by weight for the binder.

The current collector is desirably formed of an aluminum foil or an aluminum alloy foil.

It is desirable that the average crystal grain size of the aluminum foil and aluminum alloy foil is 50 μm or less, more preferably 30 μm or less, and still more preferably 5 μm or less. The strength of the aluminum foil or aluminum alloy foil can be dramatically increased by setting the average crystal grain size to 50 μm or less, and it is thus possible to increase the density of the positive electrode at a high press pressure and to increase the battery capacity. Incidentally, the average crystal grain size can be determined by a method similar to the description in the negative electrode.

The average crystal grain size of the aluminum foil and aluminum alloy foil changes by being affected by a plurality of factors such as the material structure, impurities, processing conditions, heat treatment history, and annealing conditions in a complicated manner. The crystal grain size can be prepared by combining the above-described factors in the current collector manufacturing process.

The thickness of the aluminum foil and aluminum alloy foil is 20 μm or less and more preferably 15 μm or less. The purity of aluminum foil is preferably 99% or more. The aluminum alloy is preferably an alloy containing elements such as magnesium, zinc, and silicon. On the other hand, in a case where transition metals such as iron, copper, nickel, and chromium are contained in the alloy, the content thereof is preferably 1% by weight or less.

Next, constituent members of the nonaqueous electrolyte secondary battery will be described in detail.

1) Fabrication of Positive Electrode

The positive electrode according to the present embodiment is prepared as follows. First, the above-described mixture layer-constituting materials are dissolved and mixed in N-methylpyrrolidone, and the mixture is dispersed by bead milling to prepare a paste-like positive electrode coating material. This coating material is uniformly applied to both the front and back surfaces of a positive electrode current collector formed of a strip-like aluminum foil, and dried to form a positive electrode mixture layer. The strip-like body after being dried is press-molded and cut to predetermined dimensions to which a conductive tab is welded.

The positive electrode under the conditions described above can be prepared by, for example, dry mixing conditions of active material in the fabrication of electrode, dispersion conditions at the time of the preparation of suspension, application conditions of suspension, subsequent pressing conditions, and the like. In particular, dry mixing conditions of active material and dispersion conditions at the time of the preparation of suspension are important. When the dispersion conditions are too strong, the electrode is in a state in which the primary particles are singly present.

On the other hand, when the dispersion conditions are too weak, the electrode is in a state in which a large number of secondary particles formed by the aggregation of primary particles is present.

Examples of a proper dispersion method at the time of the preparation of suspension include mill dispersion using beads having a diameter of 0.5 mm or less after the active material is pulverized using an automatic mortar, a hammer mill, or a jet mill. The dispersion method using beads having a small bead diameter is suitably used for dispersion of a material having a small particle diameter but is said to be unsuitable for dispersion of a powder having particles with a particle size of 1 µm or more because of insufficient crushing power.

2) Fabrication of Negative Electrode

As the negative electrode active material according to the present embodiment, for example, a metal, a metal alloy, a metal oxide, a metal sulfide, a metal nitride, a graphite material, and a carbonaceous material can be used. As the metal oxide, for example, a substance containing titanium, for example, a lithium-titanium composite oxide can be used. Examples of the metal sulfide include, for example, titanium sulfide such as $TiS_2$, for example, molybdenum sulfide such as $MoS_2$, and, for example, iron sulfide such as FeS, $FeS_2$, and $Li_xFeS_2$. Examples of the graphite material and carbon material include natural graphite, artificial graphite, coke, vapor-grown carbon fiber, mesophase pitch-based carbon fiber, spherical carbon, and resin-fired carbon. Incidentally, it is also possible to use a plurality of different negative electrode active materials in mixture.

In addition, as a binder for the negative electrode active material layer, for example, polytetrafluoroethylene (PTFE), polyvinylidene fluoride (PVdF), and fluorine-based rubber can be used.

Moreover, as a conductive material for the negative electrode active material layer, for example, carbon materials such as acetylene black, carbon black, graphite, carbon fiber, and graphene can be used.

Moreover, the proportions of the negative electrode active material, negative electrode conductive material, and negative electrode binder contained in the negative electrode mixture layer are preferably 70% to 95% by weight, 0% to 25% by weight, and 2% to 10% by weight, respectively.

In addition, description of the configuration common to that of the positive electrode such as the aluminum foil is omitted.

The negative electrode according to the present embodiment is formed by dissolving and mixing the above-described negative electrode mixture layer-constituting materials in N-methylpyrrolidone, dispersing the mixture by bead milling, adjusting the paste-like negative electrode coating material, uniformly applying the paste-like negative electrode coating material to both the front and back surfaces of the negative electrode current collector formed of a strip-like aluminum foil, and drying the applied paste-like negative electrode coating material. The strip-like body after being dried is press-molded and cut to predetermined dimensions to which a conductive tab is welded.

3) Separator

The separator is not particularly limited as long as it exhibits insulating property, and porous films or nonwoven fabrics formed of polymers such as polyolefins, cellulose, polyethylene terephthalate, and vinylon can be used. The material for the separator may be one type, or two or more materials may be used in combination.

4) Nonaqueous Electrolyte

The nonaqueous electrolyte contains a nonaqueous solvent and an electrolyte salt dissolved in the nonaqueous solvent.

As the electrolyte salt, for example, $LiPF_6$, $LiBF_4$, and $LiClO_4$ can be used. As the nonaqueous solvent, for example, propylene carbonate (PC), ethylene carbonate (EC), 1,2-dimethoxyethane (DME), γ-butyrolactone (GBL), tetrahydrofuran (THF), 2-methyltetrahydrofuran (2-MeHF), 1,3-dioxolan, sulfolane, acetonitrile (AN), diethyl carbonate (DEC), dimethyl carbonate (DMC), and methyl ethyl carbonate (MEC) can be used.

5) Fabrication of Electrode Group

An electrode group is configured by preparing two sheets of separators and stacking the separator, the positive electrode, the separator, and the negative electrode in this order to form a stacked body. Subsequently, the stacked body thus obtained is spirally wound so that the negative electrode is located at the outermost periphery, the winding core is removed, and then the wound body is pressed while being heated. A wound electrode group 13 can be thus fabricated.

6) Assembly of Battery

The terminals are attached to the positive electrode and the negative electrode of the wound electrode group 13 obtained as described above, respectively, the electrode group is placed in a laminate container, the above-described nonaqueous electrolyte is poured into this container, and a nonaqueous electrolyte battery can be thus obtained.

7) Example of Battery

FIG. 1 illustrates a square nonaqueous electrolyte battery, which is one of the examples of assembled batteries. The wound electrode group 13 is housed in a bottomed rectangular cylindrical container (container member) 11 formed of a metal.

As illustrated in FIG. 2, the flat wound electrode group 13 is formed by spirally winding a stacked product in which a negative electrode 3, a separator 4, a positive electrode 5, and the separator 4 are stacked in this order from the outer side and press-molding the wound product.

FIG. 1 illustrates a partially cutaway perspective view of a square nonaqueous electrolyte battery, and FIG. 2 illustrates an enlarged sectional view of portion A in FIG. 1. Incidentally, each drawing is a schematic diagram for promoting the explanation and understanding of the invention, and its shape, dimensions, ratio, and the like are different from those of actual apparatuses, but these can be appropriately changed in design in consideration of the following description and known technologies.

In the square nonaqueous electrolyte battery illustrated in FIG. 1, the wound electrode group 13 is housed in the bottomed rectangular cylindrical container (container member) 11 formed of a metal.

The nonaqueous electrolyte solution (liquid nonaqueous electrolyte) is injected, for example, through the opening of the container member 11 and accommodated in the container member 11. The wound electrode group 13 and the nonaqueous electrolyte solution are sealed in the container member by welding a rectangular lid 12 to the opening of the container member 11.

As illustrated in FIG. 2, the flat wound electrode group 13 is formed by spirally winding a stacked product in which a negative electrode 3, a separator 4, a positive electrode 5, and the separator 4 are stacked in this order from the outer side and press-molding the wound product.

One end of a negative electrode tab 18 is electrically connected to the negative electrode current collector, and the other end is electrically connected to a negative electrode terminal 20. The negative electrode terminal 20 is fixed to the rectangular lid 12 with a glass material 21 interposed therebetween by hermetic seal. One end of a positive electrode tab 17 is electrically connected to the positive electrode current collector, and the other end is electrically connected to a positive electrode terminal 19 fixed to the rectangular lid 12.

The negative electrode tab 18 is manufactured, for example, using a material such as aluminum or an aluminum alloy containing elements such as Mg, Ti, Zn, Mn, Fe, Cu, and Si. The negative electrode tab 18 is preferably formed of a material similar to that for the negative electrode current collector in order to decrease the contact resistance with the negative electrode current collector.

The positive electrode tab 17 is manufactured, for example, using a material such as aluminum or an aluminum alloy containing elements such as Mg, Ti, Zn, Mn, Fe, Cu, and Si. The positive electrode tab 17 is preferably formed of a material similar to that for the positive electrode current collector in order to decrease the contact resistance with the positive electrode current collector.

Incidentally, a wound electrode group in which a separator is wound together with a positive electrode and a negative electrode is used in the nonaqueous electrolyte battery illustrated, but a stacked electrode group may be used in which a separator is folded zigzag and a positive electrode and a negative electrode are alternately disposed at the folded place.

Hereinafter, Examples will be described in detail.

Example 1

(Fabrication of Positive Electrode)

Lithium-containing nickel-cobalt-manganese composite oxide $LiNi_{0.5}Co_{0.2}Mn_{0.3}O_2$ and lithium-containing cobalt oxide $LiCoO_2$ were used as active materials, graphite and acetylene black were provided as conductive materials, polyvinylidene fluoride (PVdF) which contained a carbonyl group and had a repeating structure of vinylidene fluoride as the basic skeleton was provided as a binder, and a paste-like positive electrode coating material was prepared as a solution in which these were dissolved in N-methylpyrrolidone at a weight ratio of 80:5:7:5:3 (3.5 parts by weight of binder to 100 parts by weight of active material) and mixed together. The solution prepared was subjected to bead mill dispersion to uniformly disperse the conductive materials therein, and a paste-like dispersion was thus obtained. The dispersion was performed using a bead wet fine particle dispersing and pulverizing machine: Sand Grinder manufactured by AIMEX CO., Ltd. Glass beads having a bead diameter of 2 mm were used as the media, and the filling factor was set to 40%. Dispersion conditions were set so that the rotation number was 800 rpm and the treatment time was 1800 seconds. This paste-like positive electrode dispersion was uniformly applied to both the front and back surfaces of a current collector formed of a strip-like aluminum foil, and dried to form a positive electrode active material layer. The strip-like body after being dried was press-formed and then cut to predetermined dimensions to which a conductive tab was welded.

(Fabrication of Negative Electrode)

$Li_4Ti_5O_{12}$ was provided as a negative electrode active material, graphite was provided as a conductive agent, polyvinylidene fluoride was provided as a binder, and a paste-like negative electrode coating material was prepared as a solution in which these were dissolved in N-methylpyrrolidone at a weight ratio of 85:10:5 and mixed together. This paste-like negative electrode coating material was uniformly applied to both the front and back surfaces of a negative electrode current collector formed of a strip-like aluminum foil, and dried to form a negative electrode active material layer. The strip-like body after being dried was press-formed and cut to predetermined dimensions to which a conductive tab was welded.

(Fabrication of Electrode Group)

Two sheets of polyethylene resin separators were provided. Next, a stacked body was formed by stacking the separator, the positive electrode, the separator, and the negative electrode in this order. Subsequently, the stacked body thus obtained was spirally wound so that the negative electrode was located at the outermost periphery, the winding core was removed, and then the wound body was pressed while being heated. A wound electrode group was thus fabricated.

(Preparation of Nonaqueous Electrolyte)

A nonaqueous electrolyte was prepared. As the nonaqueous solvent, one in which ethylene carbonate and propylene carbonate were mixed at a volume ratio of 1:2 was used. $LiPF_6$ as a electrolyte was dissolved in this nonaqueous solvent at 1.0 mol/L to prepare a nonaqueous electrolyte.

(Assembly of Battery)

A nonaqueous electrolyte secondary battery was assembled using the positive electrode and negative electrode obtained as described above. The strip-like positive electrode and negative electrode were wound with the separator interposed therebetween, and terminals were attached to the positive electrode and the negative electrode, respectively, and the wound body was placed in a laminate container. The above-described nonaqueous electrolyte was injected into this container to obtain a nonaqueous electrolyte battery.

(Measurement of Particle Size Distribution for Positive Electrode Mixture Layer)

The positive electrode is taken out from the battery before being deteriorated, immersed in ethyl methyl carbonate to remove the Li salt, and then dried. Only the positive electrode mixture layer is peeled off from the current collector of the electrode after being dried using a spatula and immersed in an NMP solvent. Thereafter, the positive electrode mixture layer was dispersed in the NMP solvent using ultrasonic waves in a state of being immersed in the NMP solvent to obtain a sample.

This dispersion was subjected to the particle diameter measurement of constituent particles using a laser diffraction type distribution measurement apparatus (Shimadzu SALD-300), as a result, the volume frequencies of the first peak (I1) corresponding to a mode diameter appearing from 0.1 µm or more to 2.0 µm or less and the second peak (I2) corresponding to a mode diameter appearing from 3.0 µm or more to 8.0 µm or less were 1.12% and 7.42%, respectively, and I1/(I1+I2) was 0.13.

FIG. 5 illustrates a particle size distribution diagram attained by the particle size distribution measurement performed for the positive electrode mixture layer according to Example 1. In this particle size distribution diagram, the horizontal axis indicates the particle diameter and the vertical axis indicates the volume frequency.

(Measurement of Pore Diameter Distribution for Positive Electrode Mixture Layer)

The positive electrode is taken out from the battery before being deteriorated, immersed in ethyl methyl carbonate to remove the Li salt, and then dried to prepare a measurement sample.

As the measurement apparatus, Autopore 9520 model manufactured by Shimadzu Corporation is used. The electrode was cut into a size of about 25×25 mm$^2$, folded, and placed in the measurement cell, and the sample is subjected to the measurement under the conditions of an initial pressure of 20 kPa (the initial pressure of 20 kPa corresponds to about 3 psia and a pressure applied to a sample having a pore diameter of about 60 µm) and a maximum pressure of 414 MPa (the maximum pressure of 414 MPa corresponds to about 59,986 psia and a pressure applied to a sample having a pore diameter of about 0.003 µm). The average value of three samples is used as the measurement result. Upon the data reduction, the pore specific surface area is calculated assuming that the pore shape is cylindrical. Incidentally, the analysis principle of the mercury intrusion method is based on Washburn's equation.

$$D = -4\gamma \cos \theta / P$$

Here, P is the pressure to be applied, D is the pore diameter, $\gamma$ is the surface tension of mercury (480 dyne·cm$^{-1}$), and $\theta$ is the contact angle between mercury and the pore wall surface is 140°. $\gamma$ and $\theta$ are constants, thus the relation between the pressure P applied and the pore diameter D is determined by Washburn's equation, and the pore diameter and the pore volume distribution can be derived by measuring the mercury intrusion volume at that time. For details of the measurement method, principle, and the like, refer to Non-Patent Literature 1 (Genji JINBO et al., "Fine Particle Handbook", Asakura Publishing Co., Ltd. (1991)), Non-Patent Literature 2 (edited by Souhachiro HAYAKAWA, "Method of Measuring Physical Properties of Powder", Asakura Publishing Co., Ltd. (1973)), and the like.

As a result, the pore volumes at peak tops of the first peak (P1) corresponding to a mode diameter appearing in a range where a pore diameter is 0.1 µm or more and less than 0.3 µm and the second peak (P2) corresponding to a mode diameter appearing in a range where a pore diameter is 0.3 µm or more and 1 µm or less are 0.1245 ml/g and 0.0447 ml/g, respectively, and the relational expression P1/(P1+P2) was 0.74. In addition, the pore volume V1 of pores having a pore diameter of 0.1 µm or more and 1.0 µm or less per 1 g of the positive electrode layer weight excluding the weight of the current collector is 0.0570 ml/g, the total pore volume V was 0.1193 ml/g, and V1/V was 0.48.

Figure 4:
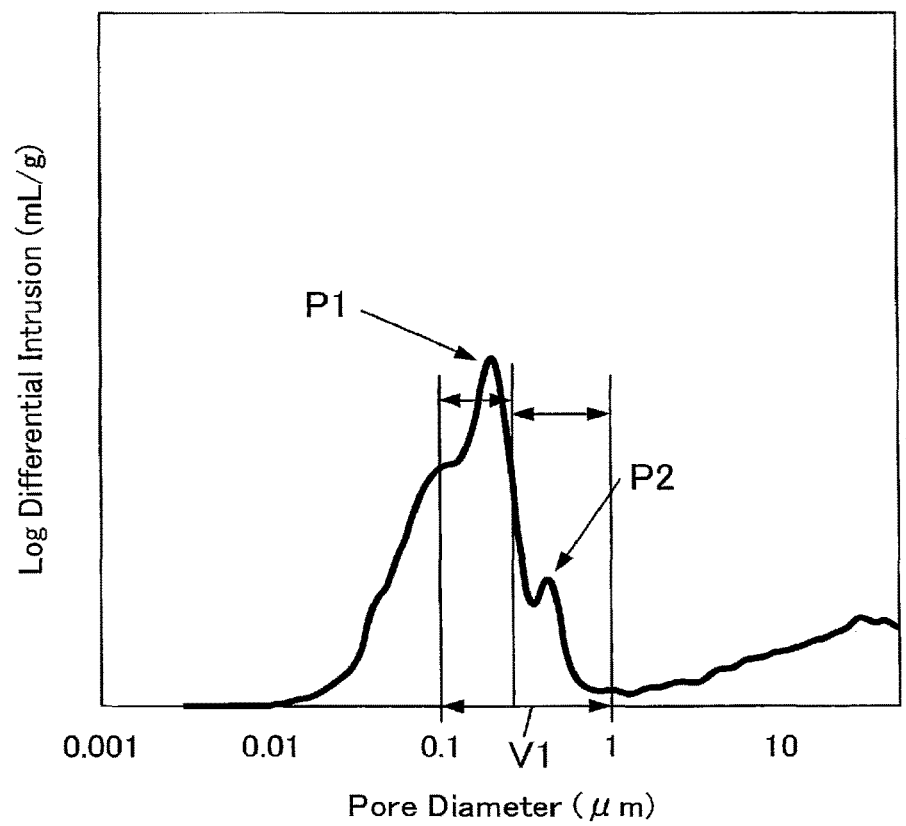
FIG. 4 illustrates a pore distribution measurement diagram of a positive electrode according to an embodiment.

FIG. 4 illustrates a pore distribution curve attained by pore diameter distribution measurement performed for the positive electrode mixture layer according to Example 1. In this pore distribution curve, the horizontal axis indicates the pore diameter, and the vertical axis indicates the logarithmic differential pore volume.

(Measurement of Pyrolysis GC/MS for Positive Electrode Mixture Layer)

In a glove box in an inert atmosphere, the positive electrode is taken out from the battery before being deteriorated, immersed in ethyl methyl carbonate to remove the Li salt, and then dried at room temperature under reduced pressure. Several mg of the mixture layer is scraped out from the current collector of the dried positive electrode using a spatula or the like. Thereafter, the mixture layer scraped into the measurement container is introduced into the apparatus while maintaining the inert atmosphere, and the measurement is performed. Attention should be paid to maintain the inert atmosphere so that $CO_2$ and moisture are not adsorbed before the sample measurement. A profile of $CO_2$ (m/z 44) generated by pyrolysis was attained by performing the pyrolysis GC/MS measurement under a temperature rise condition of 5° C./min, the $CO_2$ gas amount (mL/g) at each temperature in the profile of $CO_2$ generated was estimated based on the amount (mL/g) of $CO_2$ gas per 1 g of electrode mixture layer weight, which was generated when heating was performed at 350° C. for 1 minute.

As a result, peaks were confirmed in the first region having a peak top in a range of 100° C. or more and less than 500° C. and the second region having a peak top in a range of 500° C. or more and 600° C. or less. The areas (mL/g) C1 and C2 of the first region and second region were calculated, as a result, C1 was 9.84 mL/g, C2 was 1.24 mL/g, and C1/C2 was 7.9.

FIG. 3 illustrates the $CO_2$ (m/z 44) profile attained by pyrolysis GC/MS measurement performed for the positive electrode according to Example 1. In this $CO_2$ (m/z 44) profile, the horizontal axis indicates the temperature, and the vertical axis indicates intensity, namely, the amount (mL/g) of generated $CO_2$ in an arbitrary unit.

(Cycle Test for Battery)

In order to evaluate the durability of the nonaqueous electrolyte battery obtained, a cycle test was performed under a temperature condition of 45° C., and the cycle life and the rate of increase in resistance were determined. First, charge and discharge was performed at 45° C. and a current value of 1 C, and the first cycle discharge capacity C0 was confirmed. Next, a 2C/2C cycle test was performed in which charge was performed at a current value of 2C and discharge was performed at a current value of 2C at 45° C. Thereafter, the number of cycles at which the ratio C/C0 (capacity retention) of the discharge capacity after cycles to the first cycle discharge capacity reached 80% was confirmed to be 4500 cycles.

Example 2

Hereinafter, Example 2 will be described. Incidentally, the same description as that in Example 1 is omitted.
(Fabrication of Positive Electrode)
Lithium-containing nickel-cobalt-manganese composite oxide $LiNi_{0.5}Co_{0.2}Mn_{0.3}O_2$ and lithium-containing cobalt oxide $LiCoO_2$ were used as active materials, graphite and acetylene black were provided as conductive materials, polyvinylidene fluoride (PVdF) was provided as a binder, and a paste-like positive electrode coating material was prepared as a solution in which these were dissolved in N-methylpyrrolidone at a weight ratio of 80:5:7:5:3 (3.5 parts by weight of binder to 100 parts by weight of active material) and mixed together. The solution prepared was subjected to bead mill dispersion to uniformly disperse the conductive materials therein, and a paste-like dispersion was thus obtained. The dispersion was performed using a bead wet fine particle dispersing and pulverizing machine: Sand Grinder manufactured by AIMEX CO., Ltd. Glass beads having a bead diameter of 2 mm were used as the media, and the filling factor was set to 40%. Dispersion conditions were set so that the rotation number was 800 rpm and the treatment time was 1800 seconds. This paste-like positive electrode dispersion was uniformly applied to both the front and back surfaces of a current collector formed of a strip-like aluminum foil, and dried to form a positive electrode active material layer. The strip-like body after being dried was press-formed and then cut to predetermined dimensions to which a conductive tab was welded.
(Measurement of Particle Size Distribution for Positive Electrode Mixture Layer)
The particle size distribution was measured in the same manner as in Example 1, as a result, the volume frequencies of the first peak (I1) corresponding to a mode diameter appearing from 0.1 μm or more to 2.0 μm or less and the second peak (I2) corresponding to a mode diameter appearing from 3.0 μm or more to 8.0 μm or less were 1.25% and 6.10%, respectively, and I1/(I1+I2) was 0.17.
(Measurement of Pore Diameter Distribution for Positive Electrode Mixture Layer)
The pore diameter distribution was measured in the same manner as in Example 1, as a result, the pore volumes at peak tops of the first peak (P1) corresponding to a mode diameter appearing in a range where a pore diameter is 0.1 μm or more and less than 0.3 μm and the second peak (P2) corresponding to a mode diameter appearing in a range where a pore diameter is 0.3 μm or more and 1 μm or less are 0.1160 ml/g and 0.0521 ml/g, respectively, and the relational expression P1/(P1+P2) was 0.69. In addition, the pore volume V1 of pores having a pore diameter of 0.1 μm or more and 1.0 μm or less per 1 g of the positive electrode layer weight excluding the weight of the current collector is 0.0702 ml/g, the total pore volume V was 0.1150 ml/g, and V1/V was 0.61.
(Measurement of Pyrolysis GC/MS for Positive Electrode Mixture Layer)
The pyrolysis GC/MS was measured in the same manner as in Example 1, as a result, peaks were confirmed in the first region having a peak top in a range of 100° C. or more and less than 500° C. and the second region having a peak top in a range of 500° C. or more and 600° C. or less. The areas (mL/g) C1 and C2 of the first region and second region were calculated, as a result, C1 was 8.28 mL/g, C2 was 1.15 mL/g, and C1/C2 was 7.2.
(Cycle Test for Battery)
In order to evaluate the durability of the nonaqueous electrolyte battery obtained, a cycle test was performed under a temperature condition of 45° C., and the cycle life and the rate of increase in resistance were determined. First, charge and discharge was performed at 45° C. and a current value of 1 C, and the first cycle discharge capacity C0 was confirmed. Next, a 2C/2C cycle test was performed in which charge was performed at a current value of 2C and discharge was performed at a current value of 2C at 45° C. Thereafter, the number of cycles at which the ratio C/C0 (capacity retention) of the discharge capacity after cycles to the first cycle discharge capacity reached 80% was confirmed to be 4000 cycles.

Example 3

Hereinafter, Example 3 will be described. Incidentally, the same description as that in Example 1 is omitted.
(Fabrication of Positive Electrode)
Lithium-containing nickel-cobalt-manganese composite oxide $LiNi_{0.5}Co_{0.2}Mn_{0.3}O_2$ and lithium-containing cobalt oxide $LiCoO_2$ were used as active materials, graphite and acetylene black were provided as conductive materials, polyvinylidene fluoride (PVdF) was provided as a binder, and a paste-like positive electrode coating material was prepared as a solution in which these were dissolved in N-methylpyrrolidone at a weight ratio of 77:5:9:7:2 (2.4 parts by weight of binder to 100 parts by weight of active material) and mixed together. The solution prepared was subjected to bead mill dispersion to uniformly disperse the conductive materials therein, and a paste-like dispersion was thus obtained. The dispersion was performed using a bead wet fine particle dispersing and pulverizing machine: Sand Grinder manufactured by AIMEX CO., Ltd. Glass beads having a bead diameter of 2 mm were used as the media, and the filling factor was set to 40%. Dispersion conditions were set so that the rotation number was 800 rpm and the treatment time was 1800 seconds. This paste-like positive electrode dispersion was uniformly applied to both the front and back surfaces of a current collector formed of a strip-like aluminum foil, and dried to form a positive electrode active material layer. The strip-like body after being dried was press-formed and then cut to predetermined dimensions to which a conductive tab was welded.
(Measurement of Particle Size Distribution for Positive Electrode Mixture Layer)
The particle size distribution was measured in the same manner as in Example 1, as a result, the volume frequencies of the first peak (I1) corresponding to a mode diameter appearing from 0.1 μm or more to 2.0 μm or less and the second peak (I2) corresponding to a mode diameter appearing from 3.0 μm or more to 8.0 μm or less were 0.87% and 6.37%, respectively, and I1/(I1+I2) was 0.12.
(Measurement of Pore Diameter Distribution for Positive Electrode Mixture Layer)
The pore diameter distribution was measured in the same manner as in Example 1, as a result, the pore volumes at peak tops of the first peak (P1) corresponding to a mode diameter appearing in a range where a pore diameter is 0.1 μm or more and less than 0.3 μm and the second peak (P2)

corresponding to a mode diameter appearing in a range where a pore diameter is 0.3 µm or more and 1 µm or less are 0.1034 ml/g and 0.0227 ml/g, respectively, and the relational expression P1/(P1+P2) was 0.82. In addition, the pore volume V1 of pores having a pore diameter of 0.1 µm or more and 1.0 µm or less per 1 g of the positive electrode layer weight excluding the weight of the current collector is 0.0630 ml/g, the total pore volume V was 0.1259 ml/g, and V1/V was 0.50.

(Measurement of Pyrolysis GC/MS for Positive Electrode Mixture Layer)

The pyrolysis GC/MS was measured in the same manner as in Example 1, as a result, peaks were confirmed in the first region having a peak top in a range of 100° C. or more and less than 500° C. and the second region having a peak top in a range of 500° C. or more and 600° C. or less. The areas (mL/g) C1 and C2 of the first region and second region were calculated, as a result, C1 was 7.236 mL/g, C2 was 1.08 mL/g, and C1/C2 was 6.7.

(Cycle Test for Battery)

In order to evaluate the durability of the nonaqueous electrolyte battery obtained, a cycle test was performed under a temperature condition of 45° C., and the cycle life and the rate of increase in resistance were determined. First, charge and discharge was performed at 45° C. and a current value of 1 C, and the first cycle discharge capacity C0 was confirmed. Next, a 2C/2C cycle test was performed in which charge was performed at a current value of 2C and discharge was performed at a current value of 2C at 45° C. Thereafter, the number of cycles at which the ratio C/C0 (capacity retention) of the discharge capacity after cycles to the first cycle discharge capacity reached 80% was confirmed to be 3900 cycles.

Example 4

A nonaqueous electrolyte battery was fabricated and evaluated in the same manner as in Example 1 except that the positive electrode coating material was prepared as described below.

Lithium-containing nickel-cobalt-manganese composite oxide $LiNi_{0.6}Co_{0.2}Mn_{0.2}O_2$ and lithium-containing cobalt oxide $LiCoO_2$ were used as active materials, graphite and acetylene black were provided as conductive materials, polyvinylidene fluoride (PVdF) which contained a carbonyl group and had a repeating structure of vinylidene fluoride as the basic skeleton was provided as a binder, and a paste-like positive electrode coating material was prepared as a solution in which these were dissolved in N-methylpyrrolidone at a weight ratio of 80:5:7:5:3 (3.5 parts by weight of binder to 100 parts by weight of active material) and mixed together.

Example 5

A nonaqueous electrolyte battery was fabricated and evaluated in the same manner as in Example 1 except that the positive electrode coating material was prepared as described below.

Lithium-containing nickel-cobalt-manganese composite oxide $LiNi_{0.7}Co_{0.15}Mn_{0.15}O_2$ was used as an active material, graphite and acetylene black were provided as conductive materials, polyvinylidene fluoride (PVdF) which contained a carbonyl group and had a repeating structure of vinylidene fluoride as the basic skeleton was provided as a binder, and a paste-like positive electrode coating material was prepared as a solution in which these were dissolved in N-methylpyrrolidone at a weight ratio of 85:7:5:3 (3.5 parts by weight of binder to 100 parts by weight of active material) and mixed together.

Comparative Example 1

(Fabrication of Positive Electrode)

Lithium-containing nickel-cobalt-manganese composite oxide $LiNi_{0.5}Co_{0.2}Mn_{0.3}O_2$ and lithium-containing cobalt oxide $LiCoO_2$ were used as active materials, graphite and acetylene black were provided as conductive materials, polyvinylidene fluoride (PVdF) which contained a carbonyl group and had a repeating structure of vinylidene fluoride as the basic skeleton was provided as a binder, and a paste-like positive electrode coating material was prepared as a solution in which these were dissolved in N-methylpyrrolidone at a weight ratio of 80:5:7:5:3 (3.5 parts by weight of binder to 100 parts by weight of active material) and mixed together. The solution prepared was subjected to bead mill dispersion to uniformly disperse the conductive materials therein, and a paste-like dispersion was thus obtained. The dispersion was performed using a bead wet fine particle dispersing and pulverizing machine: Sand Grinder manufactured by AIMEX CO., Ltd. Glass beads having a bead diameter of 2 mm were used as the media, and the filling factor was set to 40%. Dispersion conditions were set so that the rotation number was 800 rpm and the treatment time was 900 seconds. This paste-like positive electrode dispersion was uniformly applied to both the front and back surfaces of a current collector formed of a strip-like aluminum foil, and dried to form a positive electrode active material layer. The strip-like body after being dried was press-formed and then cut to predetermined dimensions to which a conductive tab was welded.

(Fabrication of Negative Electrode)

$Li_4Ti_5O_{12}$ was provided as a negative electrode active material, graphite was provided as a conductive agent, polyvinylidene fluoride was provided as a binder, and a paste-like negative electrode coating material was prepared as a solution in which these were dissolved in N-methylpyrrolidone at a weight ratio of 85:10:5 and mixed together. This paste-like negative electrode coating material was uniformly applied to both the front and back surfaces of a negative electrode current collector formed of a strip-like aluminum foil, and dried to form a negative electrode active material layer. The strip-like body after being dried was press-formed and cut to predetermined dimensions to which a conductive tab was welded.

(Fabrication of Electrode Group)

Two sheets of polyethylene resin separators were provided. Next, a stacked body was formed by stacking the separator, the positive electrode, the separator, and the negative electrode in this order. Subsequently, the stacked body thus obtained was spirally wound so that the negative electrode was located at the outermost periphery, the winding core was removed, and then the wound body was pressed while being heated. A wound electrode group was thus fabricated.

(Preparation of Nonaqueous Electrolyte)

A nonaqueous electrolyte was prepared. As the nonaqueous solvent, one in which ethylene carbonate and propylene carbonate were mixed at a volume ratio of 1:2 was used. $LiPF_6$ as a electrolyte was dissolved in this nonaqueous solvent at 1.0 mol/L to prepare a nonaqueous electrolyte.

(Assembly of Battery)

A nonaqueous electrolyte secondary battery was assembled using the positive electrode and negative electrode obtained as described above. The strip-like positive electrode and negative electrode were wound with the separator interposed therebetween, and terminals were attached to the positive electrode and the negative electrode, respectively, and the wound body was placed in a laminate container. The above-described nonaqueous electrolyte was injected into this container to obtain a nonaqueous electrolyte battery.

(Measurement of Particle Size Distribution for Positive Electrode Mixture Layer)

The positive electrode is taken out from the battery before being deteriorated, immersed in ethyl methyl carbonate to remove the Li salt, and then dried. Only the positive electrode mixture layer is peeled off from the current collector of the electrode after being dried using a spatula and immersed in an NMP solvent. Thereafter, the positive electrode mixture layer was dispersed in the NMP solvent using ultrasonic waves in a state of being immersed in the NMP solvent to obtain a sample.

This dispersion was subjected to the particle diameter measurement of constituent particles using a laser diffraction type distribution measurement apparatus (Shimadzu SALD-300), as a result, the volume frequencies of the first peak (I1) corresponding to a mode diameter appearing from 0.1 μm or more to 2.0 μm or less and the second peak (I2) corresponding to a mode diameter appearing from 3.0 μm or more to 8.0 μm or less were 0.73% and 7.3%, respectively, and I1/(I1+I2) was 0.091.

(Measurement of Pore Diameter Distribution for Positive Electrode Mixture Layer)

The positive electrode is taken out from the battery before being deteriorated, immersed in ethyl methyl carbonate to remove the Li salt, and then dried to prepare a measurement sample.

As the measurement apparatus, Autopore 9520 model manufactured by Shimadzu Corporation is used. The electrode was cut into a size of about 25×25 mm$^2$, folded, and placed in the measurement cell, and the sample is subjected to the measurement under the conditions of an initial pressure of 20 kPa (the initial pressure of 20 kPa corresponds to about 3 psia and a pressure applied to a sample having a pore diameter of about 60 μm) and a maximum pressure of 414 MPa (the maximum pressure of 414 MPa corresponds to about 59,986 psia and a pressure applied to a sample having a pore diameter of about 0.003 μm). The average value of three samples is used as the measurement result. Upon the data reduction, the pore specific surface area is calculated assuming that the pore shape is cylindrical. Incidentally, the analysis principle of the mercury intrusion method is based on Washburn's equation.

$$D = -4\gamma \cos\theta / P$$

Here, P is the pressure to be applied, D is the pore diameter, γ is the surface tension of mercury (480 dyne·cm$^{-1}$), and θ is the contact angle between mercury and the pore wall surface and is 140°. γ and θ are constants, thus the relation between the pressure P applied and the pore diameter D is determined by Washburn's equation, and the pore diameter and the pore volume distribution can be derived by measuring the mercury intrusion volume at that time. For details of the measurement method, principle, and the like, refer to Non-Patent Literature 1 (Genji JINBO et al., "Fine Particle Handbook", Asakura Publishing Co., Ltd. (1991)), Non-Patent Literature 2 (edited by Souhachiro HAYAKAWA, "Method of Measuring Physical Properties of Powder", Asakura Publishing Co., Ltd. (1973)), and the like.

As a result, the pore volumes at peak tops of the first peak (P1) corresponding to a mode diameter appearing in a range where a pore diameter is 0.1 μm or more and less than 0.3 μm and the second peak (P2) corresponding to a mode diameter appearing in a range where a pore diameter is 0.3 μm or more and 1 μm or less are 0.1063 ml/g and 0.0080 ml/g, respectively, and the relational expression P1/(P1+P2) was 0.93. In addition, the pore volume V1 of pores having a pore diameter of 0.1 μm or more and 1.0 μm or less per 1 g of the positive electrode layer weight excluding the weight of the current collector is 0.0406 ml/g, the total pore volume V was 0.01069 ml/g, and V1/V was 0.38.

(Measurement of Pyrolysis GC/MS for Positive Electrode Mixture Layer)

In a glove box in an inert atmosphere, the positive electrode is taken out from the battery before being deteriorated, immersed in ethyl methyl carbonate to remove the Li salt, and then dried at room temperature under reduced pressure. Several mg of the mixture layer is scraped out from the current collector of the dried positive electrode using a spatula or the like. Thereafter, the mixture layer scraped into the measurement container is introduced into the apparatus while maintaining the inert atmosphere, and the measurement is performed. Attention should be paid to maintain the inert atmosphere so that $CO_2$ and moisture are not adsorbed before the sample measurement. A profile of $CO_2$ (m/z 44) generated by pyrolysis was attained by performing the pyrolysis GC/MS measurement under a temperature rise condition of 5° C./rain, the $CO_2$ gas amount (mL/g) at each temperature in the profile of $CO_2$ generated was estimated based on the amount (mL/g) of $CO_2$ gas per 1 g of electrode mixture layer weight, which was generated when heating was performed at 350° C. for 1 minute.

As a result, peaks were confirmed in the first region having a peak top in a range of 100° C. or more and less than 500° C. and the second region having a peak top in a range of 500° C. or more and 600° C. or less. The areas (mL/g) C1 and C2 of the first region and second region were calculated, as a result, C1 was 9.216 mL/g, C2 was 1.28 mL/g, and C1/C2 was 7.2.

(Cycle Test for Battery)

In order to evaluate the durability of the nonaqueous electrolyte battery obtained, a cycle test was performed under a temperature condition of 45° C., and the cycle life and the rate of increase in resistance were determined. First, charge and discharge was performed at 45° C. and a current value of 1 C, and the first cycle discharge capacity C0 was confirmed. Next, a 2C/2C cycle test was performed in which charge was performed at a current value of 2C and discharge was performed at a current value of 2C at 45° C. Thereafter, the number of cycles at which the ratio C/C0 (capacity retention) of the discharge capacity after cycles to the first cycle discharge capacity reached 80% was confirmed to be 2500 cycles.

Comparative Example 2

Hereinafter, Comparative Example 2 will be described. Incidentally, the same description as that in Comparative Example 1 is omitted.

(Fabrication of Positive Electrode)

Lithium-containing nickel-cobalt-manganese composite oxide $LiNi_{0.5}Co_{0.2}Mn_{0.3}O_2$ and lithium-containing cobalt oxide $LiCoO_2$ were used as active materials, graphite and acetylene black were provided as conductive materials, polyvinylidene fluoride (PVdF) which contained a carbonyl group and had a repeating structure of vinylidene fluoride as the basic skeleton was provided as a binder, and a paste-like positive electrode coating material was prepared as a solution in which these were dissolved in N-methylpyrrolidone at a weight ratio of 77:5:9:7:2 (2.4 parts by weight of binder to 100 parts by weight of active material) and mixed together. The solution prepared was subjected to bead mill dispersion to uniformly disperse the conductive materials therein, and a paste-like dispersion was thus obtained. The dispersion was performed using a bead wet fine particle dispersing and pulverizing machine: Sand Grinder manufactured by AIMEX CO., Ltd. Glass beads having a bead diameter of 2 mm were used as the media, and the filling factor was set to 40%. Dispersion conditions were set so that the rotation number was 800 rpm and the treatment time was 300 seconds. This paste-like positive electrode dispersion was uniformly applied to both the front and back surfaces of a current collector formed of a strip-like aluminum foil, and dried to form a positive electrode active material layer. The strip-like body after being dried was press-formed and then cut to predetermined dimensions to which a conductive tab was welded.

(Measurement of Particle Size Distribution for Positive Electrode Mixture Layer)

The particle size distribution was measured in the same manner as in Comparative Example 1, as a result, the volume frequencies of the first peak (I1) corresponding to a mode diameter appearing from 0.1 μm or more to 2.0 μm or less and the second peak (I2) corresponding to a mode diameter appearing from 3.0 μm or more to 8.0 μm or less were 0.62% and 7.5%, respectively, and I1/(I1+I2) was 0.076.

(Measurement of Pore Diameter Distribution for Positive Electrode Mixture Layer)

The pore diameter distribution was measured in the same manner as in Comparative Example 1, as a result, the pore volumes at peak tops of the first peak (P1) corresponding to a mode diameter appearing in a range where a pore diameter is 0.1 μm or more and less than 0.3 μm and the second peak (P2) corresponding to a mode diameter appearing in a range where a pore diameter is 0.3 μm or more and 1 μm or less are 0.1272 ml/g and 0.0053 ml/g, respectively, and the relational expression P1/(P1+P2) was 0.96. In addition, the pore volume V1 of pores having a pore diameter of 0.1 μm or more and 1.0 μm or less per 1 g of the positive electrode layer weight excluding the weight of the current collector is 0.0341 ml/g, the total pore volume V was 0.01034 ml/g, and V1/V was 0.33.

(Measurement of Pyrolysis GC/MS for Positive Electrode Mixture Layer)

The pyrolysis GC/MS was measured in the same manner as in Comparative Example 1, as a result, peaks were confirmed in the first region having a peak top in a range of 100° C. or more and less than 500° C. and the second region having a peak top in a range of 500° C. or more and 600° C. or less. The areas (mL/g) C1 and C2 of the first region and second region were calculated, as a result, C1 was 8.390 mL/g, C2 was 1.19 mL/g, and C1/C2 was 7.1.

(Cycle Test for Battery)

In order to evaluate the durability of the nonaqueous electrolyte battery obtained, a cycle test was performed under a temperature condition of 45° C., and the cycle life and the rate of increase in resistance were determined. First, charge and discharge was performed at 45° C. and a current value of 1 C, and the first cycle discharge capacity C0 was confirmed. Next, a 2C/2C cycle test was performed in which charge was performed at a current value of 2C and discharge was performed at a current value of 2C at 45° C. Thereafter, the number of cycles at which the ratio C/C0 (capacity retention) of the discharge capacity after cycles to the first cycle discharge capacity reached 80% was confirmed to be 2000 cycles.

Comparative Example 3

Hereinafter, Comparative Example 3 will be described. Incidentally, the same description as that in Comparative Example 1 is omitted.

(Fabrication of Positive Electrode)

Lithium-containing nickel-cobalt-manganese composite oxide $LiNi_{0.5}Co_{0.2}Mn_{0.3}O_2$ and lithium-containing cobalt oxide $LiCoO_2$ were used as active materials, graphite and acetylene black were provided as conductive materials, polyvinylidene fluoride (PVdF) was provided as a binder, and a paste-like positive electrode coating material was prepared as a solution in which these were dissolved in N-methylpyrrolidone at a weight ratio of 80:5:7:5:3 (3.5 parts by weight of binder to 100 parts by weight of active material) and mixed together. The solution prepared was subjected to bead mill dispersion to uniformly disperse the conductive materials therein, and a paste-like dispersion was thus obtained. The dispersion was performed using a bead wet fine particle dispersing and pulverizing machine: Sand Grinder manufactured by AIMEX CO., Ltd. Glass beads having a bead diameter of 2 mm were used as the media, and the filling factor was set to 40%. Dispersion conditions were set so that the rotation number was 800 rpm and the treatment time was 3600 seconds. This paste-like positive electrode dispersion was uniformly applied to both the front and back surfaces of a current collector formed of a strip-like aluminum foil, and dried to form a positive electrode active material layer. The strip-like body after being dried was press-formed and then cut to predetermined dimensions to which a conductive tab was welded.

(Measurement of Particle Size Distribution for Positive Electrode Mixture Layer)

The particle size distribution was measured in the same manner as in Comparative Example 1, as a result, the volume frequencies of the first peak (I1) corresponding to a mode diameter appearing from 0.1 μm or more to 2.0 μm or less and the second peak (I2) corresponding to a mode diameter appearing from 3.0 μm or more to 8.0 μm or less were 2.51% and 5.1%, respectively, and I1/(I1+I2) was 0.33.

(Measurement of Pore Diameter Distribution for Positive Electrode Mixture Layer)

The pore diameter distribution was measured in the same manner as in Comparative Example 1, as a result, the pore volumes at peak tops of the first peak (P1) corresponding to a mode diameter appearing in a range where a pore diameter is 0.1 μm or more and less than 0.3 μm and the second peak (P2) corresponding to a mode diameter appearing in a range where a pore diameter is 0.3 μm or more and 1 μm or less are 0.0744 ml/g and 0.0660 ml/g, respectively, and the relational expression P1/(P1+P2) was 0.53. In addition, the pore volume V1 of pores having a pore diameter of 0.1 μm or more and 1.0 μm or less per 1 g of the positive electrode layer weight excluding the weight of the current collector is 0.0969 ml/g, the total pore volume V was 0.1310 ml/g, and V1/V was 0.74.

(Measurement of Pyrolysis GC/MS for Positive Electrode Mixture Layer)

The pyrolysis GC/MS was measured in the same manner as in Comparative Example 1, as a result, peaks were confirmed in the first region having a peak top in a range of 100° C. or more and less than 500° C. and the second region having a peak top in a range of 500° C. or more and 600° C. or less. The areas (mL/g) C1 and C2 of the first region and second region were calculated, as a result, C1 was 8.12 mL/g, C2 was 1.16 mL/g, and C1/C2 was 7.0.

(Cycle Test for Battery)

In order to evaluate the durability of the nonaqueous electrolyte battery obtained, a cycle test was performed under a temperature condition of 45° C., and the cycle life and the rate of increase in resistance were determined. First, charge and discharge was performed at 45° C. and a current value of 1 C, and the first cycle discharge capacity C0 was confirmed. Next, a 2C/2C cycle test was performed in which charge was performed at a current value of 2C and discharge was performed at a current value of 2C at 45° C. Thereafter, the number of cycles at which the ratio C/C0 (capacity retention) of the discharge capacity after cycles to the first cycle discharge capacity reached 80% was confirmed to be 2200 cycles.

Comparative Example 4

Hereinafter, Comparative Example 4 will be described. Incidentally, the same description as that in Comparative Example 1 is omitted.

(Fabrication of Positive Electrode)

Lithium-containing nickel-cobalt-manganese composite oxide $LiNi_{0.5}Co_{0.2}Mn_{0.3}O_2$ and lithium-containing cobalt oxide $LiCoO_2$ were used as active materials, graphite and acetylene black were provided as conductive materials, polyvinylidene fluoride (PVdF) was provided as a binder, and a paste-like positive electrode coating material was prepared as a solution in which these were dissolved in N-methylpyrrolidone at a weight ratio of 77:5:9:7:2 (2.4 parts by weight of binder to 100 parts by weight of active material) and mixed together. The solution prepared was subjected to bead mill dispersion to uniformly disperse the conductive materials therein, and a paste-like dispersion was thus obtained. The dispersion was performed using a bead wet fine particle dispersing and pulverizing machine: Sand Grinder manufactured by AIMEX CO., Ltd. Glass beads having a bead diameter of 2 mm were used as the media, and the filling factor was set to 40%. Dispersion conditions were set so that the rotation number was 800 rpm and the treatment time was 1200 seconds. This paste-like positive electrode dispersion was uniformly applied to both the front and back surfaces of a current collector formed of a strip-like aluminum foil, and dried to form a positive electrode active material layer. The strip-like body after being dried was press-formed and then cut to predetermined dimensions to which a conductive tab was welded.

(Measurement of Particle Size Distribution for Positive Electrode Mixture Layer)

The particle size distribution was measured in the same manner as in Comparative Example 1, as a result, the volume frequencies of the first peak (I1) corresponding to a mode diameter appearing from 0.1 μm or more to 2.0 μm or less and the second peak (I2) corresponding to a mode diameter appearing from 3.0 μm or more to 8.0 μm or less were 1.18% and 7.9%, respectively, and I1/(I1+I2) was 0.13.

(Measurement of Pore Diameter Distribution for Positive Electrode Mixture Layer)

The pore diameter distribution was measured in the same manner as in Comparative Example 1, as a result, the pore volumes at peak tops of the first peak (P1) corresponding to a mode diameter appearing in a range where a pore diameter is 0.1 μm or more and less than 0.3 μm and the second peak (P2) corresponding to a mode diameter appearing in a range where a pore diameter is 0.3 μm or more and 1 μm or less are 0.1488 ml/g and 0.0095 ml/g, respectively, and the relational expression P1/(P1+P2) was 0.94. In addition, the pore volume V1 of pores having a pore diameter of 0.1 μm or more and 1.0 μm or less per 1 g of the positive electrode layer weight excluding the weight of the current collector is 0.1380 ml/g, the total pore volume V was 0.1008 ml/g, and V1/V was 1.4.

(Measurement of Pyrolysis GC/MS for Positive Electrode Mixture Layer)

The pyrolysis GC/MS was measured in the same manner as in Comparative Example 1, as a result, peaks were confirmed in the first region having a peak top in a range of 100° C. or more and less than 500° C. and the second region having a peak top in a range of 500° C. or more and 600° C. or less. The areas (mL/g) C1 and C2 of the first region and second region were calculated, as a result, C1 was 11.31 mL/g, C2 was 2.17 mL/g, and C1/C2 was 5.2.

(Cycle Test for Battery)

In order to evaluate the durability of the nonaqueous electrolyte battery obtained, a cycle test was performed under a temperature condition of 45° C., and the cycle life and the rate of increase in resistance were determined. First, charge and discharge was performed at 45° C. and a current value of 1 C, and the first cycle discharge capacity C0 was confirmed. Next, a 2C/2C cycle test was performed in which charge was performed at a current value of 2C and discharge was performed at a current value of 2C at 45° C. Thereafter, the number of cycles at which the ratio C/C0 (capacity retention) of the discharge capacity after cycles to the first cycle discharge capacity reached 80% was confirmed to be 2000 cycles.

Comparative Example 5

Hereinafter, Comparative Example 5 will be described. Incidentally, the same description as that in Comparative Example 1 is omitted.

(Fabrication of Positive Electrode)

Lithium-containing nickel-cobalt-manganese composite oxide $LiNi_{0.5}Co_{0.2}Mn_{0.3}O_2$ and lithium-containing cobalt oxide $LiCoO_2$ were used as active materials, graphite and acetylene black were provided as conductive materials, polyvinylidene fluoride (PVdF) which contained a carbonyl group and had a repeating structure of vinylidene fluoride as the basic skeleton was provided as a binder, and a paste-like positive electrode coating material was prepared as a solution in which these were dissolved in N-methylpyrrolidone at a weight ratio of 80:5:7.75:5:4.25 (5 parts by weight of binder to 100 parts by weight of active material) and mixed together. The solution prepared was subjected to bead mill dispersion to uniformly disperse the conductive materials therein, and a paste-like dispersion was thus obtained. The dispersion was performed using a bead wet fine particle dispersing and pulverizing machine: Sand Grinder manufactured by AIMEX CO., Ltd. Glass beads having a bead diameter of 2 mm were used as the media, and the filling factor was set to 40%. Dispersion conditions were set so that the rotation number was 800 rpm and the treatment time was 1800 seconds. This paste-like positive electrode dispersion was uniformly applied to both the front and back surfaces of a current collector formed of a strip-like aluminum foil, and dried to form a positive electrode active material layer. The strip-like body after being dried was press-formed and then cut to predetermined dimensions to which a conductive tab was welded.

(Measurement of Particle Size Distribution for Positive Electrode Mixture Layer)

The particle size distribution was measured in the same manner as in Comparative Example 1, as a result, the volume frequencies of the first peak (I1) corresponding to a mode diameter appearing from 0.1 μm or more to 2.0 μm or less and the second peak (I2) corresponding to a mode diameter appearing from 3.0 μm or more to 8.0 μm or less were 1.12% and 7.42%, respectively, and I1/(I1+I2) was 0.13.

(Measurement of Pore Diameter Distribution for Positive Electrode Mixture Layer)

The pore diameter distribution was measured in the same manner as in Comparative Example 1, as a result, the pore volumes at peak tops of the first peak (P1) corresponding to a mode diameter appearing in a range where a pore diameter is 0.1 μm or more and less than 0.3 μm and the second peak (P2) corresponding to a mode diameter appearing in a range where a pore diameter is 0.3 μm or more and 1 μm or less are 0.1245 ml/g and 0.0447 ml/g, respectively, and the relational expression P1/(P1+P2) was 0.74. In addition, the pore volume V1 of pores having a pore diameter of 0.1 μm or more and 1.0 μm or less per 1 g of the positive electrode layer weight excluding the weight of the current collector is 0.0570 ml/g, the total pore volume V was 0.1193 ml/g, and V1/V was 0.48.

(Measurement of Pyrolysis GC/MS for Positive Electrode Mixture Layer)

The pyrolysis GC/MS was measured in the same manner as in Comparative Example 1, as a result, peaks were confirmed in the first region having a peak top in a range of 100° C. or more and less than 500° C. and the second region having a peak top in a range of 500° C. or more and 600° C. or less. The areas (mL/g) C1 and C2 of the first region and second region were calculated, as a result, C1 was 12.4 mL/g, C2 was 1.13 mL/g, and C1/C2 was 11.

(Cycle Test for Battery)

In order to evaluate the durability of the nonaqueous electrolyte battery obtained, a cycle test was performed under a temperature condition of 45° C., and the cycle life and the rate of increase in resistance were determined. First, charge and discharge was performed at 45° C. and a current value of 1 C, and the first cycle discharge capacity C0 was confirmed. Next, a 2C/2C cycle test was performed in which charge was performed at a current value of 2C and discharge was performed at a current value of 2C at 45° C. Thereafter, the number of cycles at which the ratio C/C0 (capacity retention) of the discharge capacity after cycles to the first cycle discharge capacity reached 80% was confirmed to be 2000 cycles.

(Example 1) to (Example 3) and (Comparative Example 1) to (Comparative Example 5) above are presented in Table 1.

Furthermore, the results of (Example 4) and (Example 5) above are also presented in Table 1. In Table 1, parts by weight of binder with respect to 100 parts by weight of active material is presented in the column for parts by weight of binder.

TABLE 1

| | Parts by weight of binder (vs. 100 parts by weight of active material) | Type of binder | Bead mill treatment time | Particle size distribution | | | Pore diameter distribution (mercury intrusion method) |
|---|---|---|---|---|---|---|---|
| | | | | I1 (%) | I2 (%) | I1/(I1 + I2) | P1 (ml/g) |
| Ex. 1 | 3.5 | Carbonyl group-containing PVdF | 1800 | 1.12 | 7.42 | 0.13 | 0.1245 |
| Ex. 2 | 3.5 | PVdF | 1800 | 1.25 | 6.10 | 0.17 | 0.1160 |
| Ex. 3 | 2.4 | PVdF | 1800 | 0.87 | 6.37 | 0.12 | 0.1034 |
| Ex. 4 | 3.5 | Carbonyl group-containing PVdF | 1800 | 1.1 | 6.20 | 0.15 | 0.1197 |
| Ex. 5 | 3.5 | Carbonyl group-containing PVdF | 1800 | 1.37 | 5.50 | 0.20 | 0.1211 |
| Comp. Ex. 1 | 3.5 | Carbonyl group-containing PVdF | 900 | 0.73 | 7.30 | 0.091 | 0.1063 |
| Comp. Ex. 2 | 2.4 | Carbonyl group-containing PVdF | 300 | 0.62 | 7.50 | 0.076 | 0.1272 |
| Comp. Ex. 3 | 3.5 | PVdF | 3600 | 2.51 | 5.10 | 0.33 | 0.0744 |
| Comp. Ex. 4 | 2.4 | PVdF | 1200 | 1.18 | 7.9 | 0.13 | 0.1488 |
| Comp. Ex. 5 | 5 | Carbonyl group-containing PVdF | 1800 | 1.12 | 7.42 | 0.13 | 0.1245 |

| | Pore diameter distribution (mercury intrusion method) | | Pore volume | | | $CO_2$ gas | | | |
|---|---|---|---|---|---|---|---|---|---|
| | P2 (ml/g) | P1/(P1 + P2) | V1 (ml/g) | V (ml/g) | V1/V | C1 (mL/g) | C2 (mL/g) | C1/C2 | Cycles |
| Ex. 1 | 0.0447 | 0.74 | 0.0570 | 0.1193 | 0.48 | 9.84 | 1.24 | 7.9 | 4500 |
| Ex. 2 | 0.0521 | 0.69 | 0.0702 | 0.1150 | 0.61 | 8.28 | 1.15 | 7.2 | 4000 |
| Ex. 3 | 0.0227 | 0.82 | 0.0630 | 0.1259 | 0.50 | 7.236 | 1.08 | 6.7 | 3900 |
| Ex. 4 | 0.0431 | 0.73 | 0.0570 | 0.1193 | 0.48 | 9.84 | 1.24 | 7.9 | 4000 |
| Ex. 5 | 0.0520 | 0.70 | 0.0710 | 0.1150 | 0.62 | 8.28 | 1.15 | 7.2 | 3900 |
| Comp. Ex. 1 | 0.0080 | 0.93 | 0.0406 | 0.0107 | 0.38 | 9.216 | 1.28 | 7.2 | 2500 |
| Comp. Ex. 2 | 0.0053 | 0.96 | 0.0341 | 0.0103 | 0.33 | 8.39 | 1.19 | 7.1 | 2000 |
| Comp. Ex. 3 | 0.0660 | 0.53 | 0.0969 | 0.1310 | 0.74 | 8.12 | 1.16 | 7.0 | 2200 |

TABLE 1-continued

| | | | | | | | | | |
|---|---|---|---|---|---|---|---|---|---|
| Comp. Ex. 4 | 0.0095 | 0.94 | 0.1380 | 0.1008 | 1.4 | 11.31 | 2.17 | 5.2 | 2000 |
| Comp. Ex. 5 | 0.0447 | 0.74 | 0.0570 | 0.1193 | 0.48 | 12.4 | 1.13 | 11 | 2000 |

As is apparent from Table 1, a battery exhibiting excellent cycle characteristics is obtained according to a positive electrode having the following features. In other words, the positive electrode has a first peak (P1) corresponding to a mode diameter appearing in a range where a pore diameter is 0.1 µm or more and less than 0.3 µm and a second peak (P2) corresponding to a mode diameter appearing in a range where a pore diameter is 0.3 µm or more and 1 µm or less in a pore distribution curve attained by a mercury intrusion method, where $0.60 \leq P1/(P1+P2) \leq 0.9$ is satisfied when pore volumes at peak tops of the peak (P1) and peak (P2) are denoted as P1 [ml/g] and P2 [ml/g], respectively. In the positive electrode, a pore volume V1 [ml/g] of pores having a pore diameter of 0.1 µm or more and 1.0 µm or less and a total pore volume V [ml/g] satisfy $0.45 \leq V1/V \leq 0.7$. The $CO_2$ (m/z 44) profile attained by pyrolysis GC/MS measurement of the positive electrode mixture layer has the following features. In the $CO_2$ (m/z 44) profile attained by pyrolysis GC/MS measurement performed under a temperature rise condition of 5° C./min, there are a first region having a peak top in a range of 100° C. or more and less than 500° C. and a second region having a peak top in a range of 500° C. or more and 600° C. or less and the areas C1 and C2 (mL/g) of the first region and second region satisfy $6 \leq C1/C2 \leq 10$.

Moreover, in the particle size distribution measurement of the positive electrode, in a case where there are a first peak (I1) corresponding to a mode diameter appearing from 0.1 µm or more to 2.0 µm or less and a second peak (I2) corresponding to a mode diameter appearing from 3.0 µm or more to 8.0 µm or less, and when volume frequencies of the peaks (I1) and (I2) are denoted as I1 [%] and I2 [%], respectively, and I1/(I1+I2) satisfies 0.10 or more and 0.30 or less, a battery exhibiting excellent cycle characteristics is obtained.

Furthermore, in a case where the binder in the positive electrode is added in an amount to be in a range of 0.1 parts by weight or more and 4 parts by weight or less with respect to 100 parts by weight of the active material, a battery exhibiting more favorable cycle characteristics is obtained.

As is apparent from the comparison between Example 1 and Examples 4 and 5, batteries comprising a positive electrode having the above-described features were able to achieve excellent cycle characteristics even in a case where the type of active material was changed.

In the following, the invention described in the original claims of Japanese Patent Application No. 2017-214994 on which the priority is claimed is appended.

[1]

A positive electrode for a nonaqueous electrolyte battery including: a positive electrode material layer including, when the positive electrode material layer is subjected to pyrolysis GC/MS measurement under a temperature rise condition of 5° C./min, a first region having a peak top in a range of 100° C. to 500° C. and a second region having a peak top in a range of 500° C. to 600° C., where peak areas (mL/g) C1 and C2 of the first region and the second region satisfy a following Formula (1):

$$6 \leq C1/C2 \leq 10 \qquad (1),$$

the positive electrode including, in a pore distribution curve attained by a mercury intrusion method, a first peak (P1) having a mode diameter in a range where a pore diameter is 0.1 µm or more and 0.3 µm or less and a second peak (P2) having a mode diameter in a range where a pore diameter is 0.3 µm or more and 1 µm or less, and when pore volumes at peak tops of the peak (P1) and the peak (P2) are denoted as P1 [ml/g] and P2 [ml/g], respectively, these satisfy a following Formula (2):

$$0.60 \leq P1/(P1+P2) \leq 0.9 \qquad (2), \text{ and}$$

when a pore volume V1 [ml/g] of pores having a pore diameter of 0.1 µm or more and 1.0 µm or less and a total pore volume V [ml/g], these satisfy a following Formula (3):

$$0.45 \leq V1/V \leq 0.7 \qquad (3); \text{ and}$$

a positive electrode current collector on which the positive electrode material layer is formed.

[2]

The positive electrode for a nonaqueous electrolyte battery according to [1], in which the positive electrode includes a first peak (I1) having a mode diameter from 0.1 µm or more to 2.0 µm or less and a second peak (I2) having a mode diameter from 3.0 µm or more to 8.0 µm or less in particle size distribution of the positive electrode, and when volume frequencies of the peaks (I1) and (I2) are denoted as I1 [%] and I2 [%], respectively, these satisfy a following Formula (4):

$$0.10 \leq I1/(I1+I2) \leq 0.30 \qquad (4).$$

[3]

The positive electrode for a nonaqueous electrolyte battery according to [1] or [2], in which the positive electrode further contains a binder from 0.1 parts by weight or more to 4 parts by weight or less with respect to 100 parts by weight of the active material.

[4]

A nonaqueous electrolyte battery including:

the positive electrode for the nonaqueous electrolyte battery according to any one of [1] to [3];

a negative electrode for the nonaqueous electrolyte battery; and a separator.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A positive electrode for a nonaqueous electrolyte battery, comprising:
a positive electrode current collector and a positive electrode material layer that is formed on the positive electrode current collector and contains an active material, and a binder, wherein the active material is nickel-cobalt-manganese composite oxide and, optionally, further includes lithium-containing cobalt oxide, wherein the binder is selected from the group consisting of polyvinylidene fluoride and polyvinylidene fluoride having a carbonyl group, where the binder is contained in a range of 0.1 parts by weight or more and 4 parts by weight or less with respect to 100 parts by weight of the active material, wherein, when the positive electrode material layer is subjected to pyrolysis GC/MS measurement under a temperature rise condition of 5° C./min, an area C1 in mL/g of a first region having a peak top in a range of 100° C. or more and less than 500° C., and an area C2 in mL/g of a second region having a peak top in a range of 500° C. or more and 600° C. or less, satisfy a following Formula (1):

$$6 < C1/C2 < 10 \qquad (1),$$

the area C1 being in a range of from 7.236 mL/g to 9.84 mL/g, and the area C2 being in a range of from 1.08 mL/g to 1.24 mL/g, wherein the positive electrode comprises, in a pore distribution curve attained by a mercury intrusion method, a first peak (PA) corresponding to a mode diameter appearing in a range where a pore diameter is 0.1 μm or more and less than 0.3 μm, and a second peak (PB) corresponding to a mode diameter appearing in a range where a pore diameter is 0.3 μm or more and 1 μm or less, and wherein, when pore volumes at peak tops of the first peak (PA) and the second peak (PB) are denoted as P1 in mL/g and P2 in mL/g, respectively, these satisfy a following Formula (2):

$$0.60 < P1/(P1+P2) < 0.9 \qquad (2), \text{ and}$$

wherein, when a pore volume V1 in mL/g of pores having a pore diameter of 0.1 μm or more and 1.0 μm or less and a total pore volume V in mL/g, these satisfy a following Formula (3):

$$0.45 < V1/V < 0.7 \qquad (3).$$

2. The positive electrode for nonaqueous electrolyte battery according to claim 1, wherein the positive electrode material layer comprises, in particle size distribution, a first peak (IA) corresponding to a mode diameter appearing in a range of 0.1 μm or more and 2.0 μm or less and a second peak (IB) corresponding to a mode diameter appearing in a range of 3.0 μm or more and 8.0 μm or less, and when volume frequencies of the peaks (IA) and (IB) are denoted as I1 [%] and I2 [%], respectively, these satisfy a following Formula (4):

$$0.10 \leq I1/(I1+I2) \leq 0.30 \qquad (4).$$

3. The positive electrode for nonaqueous electrolyte battery according to claim 2, wherein the ratio $I1/(I1+I2)$ satisfies a following Formula (5):

$$0.10 \leq I1/(I1+I2) \leq 0.20 \qquad (5).$$

4. A nonaqueous electrolyte battery comprising:
the positive electrode for the nonaqueous electrolyte battery according to claim 1;
a negative electrode for a nonaqueous electrolyte battery; and
a separator.

5. The positive electrode for nonaqueous electrolyte battery according to claim 1, wherein the active material is the lithium-containing nickel-cobalt-manganese composite oxide.

6. The positive electrode for nonaqueous electrolyte battery according to claim 1, wherein the active material is the lithium-containing nickel-cobalt-manganese composite oxide and the lithium-containing cobalt oxide.

* * * * *